United States Patent
Aldana López et al.

(10) Patent No.: US 10,696,372 B2
(45) Date of Patent: Jun. 30, 2020

(54) TRANSFORMABLE UNMANNED VEHICLES AND RELATED METHODS

(71) Applicant: Intel Corporation, Santa Clara, CA (US)

(72) Inventors: Rodrigo Aldana López, Zapopan (MX); David Gómez Gutiérrez, Zapopan (MX); José Ignacio Parra Vilchis, Guadalajara (MX); Rafael De La Guardia González, Teuchitlan (MX); Leobardo Emmanuel Campos Macías, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 15/720,813

(22) Filed: Sep. 29, 2017

(65) Prior Publication Data

US 2019/0100296 A1 Apr. 4, 2019

(51) Int. Cl.
*B64C 39/02* (2006.01)
*B64C 1/06* (2006.01)
*G05D 1/04* (2006.01)
*B64D 47/08* (2006.01)

(52) U.S. Cl.
CPC ............ *B64C 1/063* (2013.01); *B64C 39/024* (2013.01); *B64D 47/08* (2013.01); *G05D 1/042* (2013.01); *B64C 2201/108* (2013.01); *B64C 2201/127* (2013.01); *B64C 2201/165* (2013.01)

(58) Field of Classification Search
CPC . B64C 1/063; B64C 39/024; B64C 2201/108; B64C 2201/127; B64C 2201/162; B64C 2201/18; B64C 2211/00; G05D 1/042; B64D 47/08

USPC ....................................................... 244/117 R
See application file for complete search history.

(56) References Cited

U.S. PATENT DOCUMENTS

| | | | | |
|---|---|---|---|---|
| 2,952,460 A | * | 9/1960 | Ellis | A63B 43/00 473/609 |
| 3,394,906 A | * | 7/1968 | Rogers | B64C 39/001 244/23 R |
| 4,955,841 A | * | 9/1990 | Pastrano | A63H 33/18 446/46 |

(Continued)

FOREIGN PATENT DOCUMENTS

WO WO-2017105266 A1 * 6/2017 ........... B64C 39/001

OTHER PUBLICATIONS

"Cheerson CX-31 is a rather odd-looking Frisbee-style drone", published Mar. 25, 2015, retrieved by Examiner from http://www.rcdronearena.com/2015/03/25/cheersons-cx-31-launch-price/ on Sep. 6, 2019 (Year: 2015).*

*Primary Examiner* — Claude J Brown
(74) *Attorney, Agent, or Firm* — Hanley, Flight & Zimmerman, LLC

(57) ABSTRACT

Transformable unmanned vehicles and related methods are disclosed. An example vehicle includes a body having, a first cap, a second cap spaced from the first cap, and a plurality of segments radially spaced relative to a longitudinal axis of the body. The segments are movable relative to the first cap and the second cap. The vehicle includes a payload supported by the first cap. An actuation system moves the segments relative to the first cap and the second cap to transform the body between a first configuration and a second configuration different than the first configuration.

18 Claims, 16 Drawing Sheets

(56) References Cited

U.S. PATENT DOCUMENTS

| | | | | |
|---|---|---|---|---|
| 5,674,102 A * | 10/1997 | Lin | | A63H 33/18 |
| | | | | 446/46 |
| 5,797,815 A * | 8/1998 | Goldman | | A63H 33/18 |
| | | | | 446/46 |
| D434,457 S * | 11/2000 | Goldman | | D21/440 |
| D441,407 S * | 5/2001 | Goldman | | D21/398 |
| 6,224,452 B1 * | 5/2001 | Morse | | A63H 27/00 |
| | | | | 446/46 |
| 6,863,588 B1 * | 3/2005 | Chu | | A63B 43/00 |
| | | | | 446/46 |
| 6,896,577 B1 * | 5/2005 | Feng | | A63H 33/18 |
| | | | | 446/46 |
| 7,712,701 B1 * | 5/2010 | Ehrmantraut | | B64C 27/20 |
| | | | | 244/17.23 |
| 7,914,405 B1 * | 3/2011 | Scheffler | | A01K 15/026 |
| | | | | 119/707 |
| 8,197,298 B2 * | 6/2012 | Willett | | A63H 17/02 |
| | | | | 446/164 |
| 9,145,207 B2 * | 9/2015 | Moschetta | | B64C 25/36 |
| D768,246 S * | 10/2016 | Goldman | | D21/712 |
| 10,104,289 B2 * | 10/2018 | Enriquez | | H04N 5/23238 |
| 10,300,346 B2 * | 5/2019 | Hinnen, III | | A63B 43/002 |
| 2002/0104921 A1 * | 8/2002 | Louvel | | A63H 27/04 |
| | | | | 244/12.1 |
| 2003/0218093 A1 * | 11/2003 | Millea | | B64C 27/20 |
| | | | | 244/60 |
| 2005/0082421 A1 * | 4/2005 | Perlo | | A63H 27/12 |
| | | | | 244/12.2 |
| 2006/0144994 A1 * | 7/2006 | Spirov | | B60V 1/06 |
| | | | | 244/62 |
| 2012/0138732 A1 * | 6/2012 | Olm | | B64C 39/024 |
| | | | | 244/17.23 |
| 2012/0302125 A1 * | 11/2012 | Choh | | A63H 27/12 |
| | | | | 446/46 |
| 2014/0131507 A1 * | 5/2014 | Kalantari | | A63H 27/12 |
| | | | | 244/2 |
| 2016/0137293 A1 * | 5/2016 | Santangelo | | B64C 39/024 |
| | | | | 244/50 |
| 2016/0272312 A1 * | 9/2016 | Mallard | | B64C 29/0033 |
| 2016/0272317 A1 * | 9/2016 | Cho | | G08G 1/09 |
| 2016/0346628 A1 * | 12/2016 | Tiefel | | A63H 33/003 |
| 2017/0029101 A1 * | 2/2017 | Weissenberg | | B64C 27/006 |
| 2018/0178896 A1 * | 6/2018 | Lee | | B64C 11/28 |
| 2018/0208295 A1 * | 7/2018 | Mores | | B64C 27/20 |
| 2018/0304984 A1 * | 10/2018 | Zheng | | B64C 1/30 |

* cited by examiner

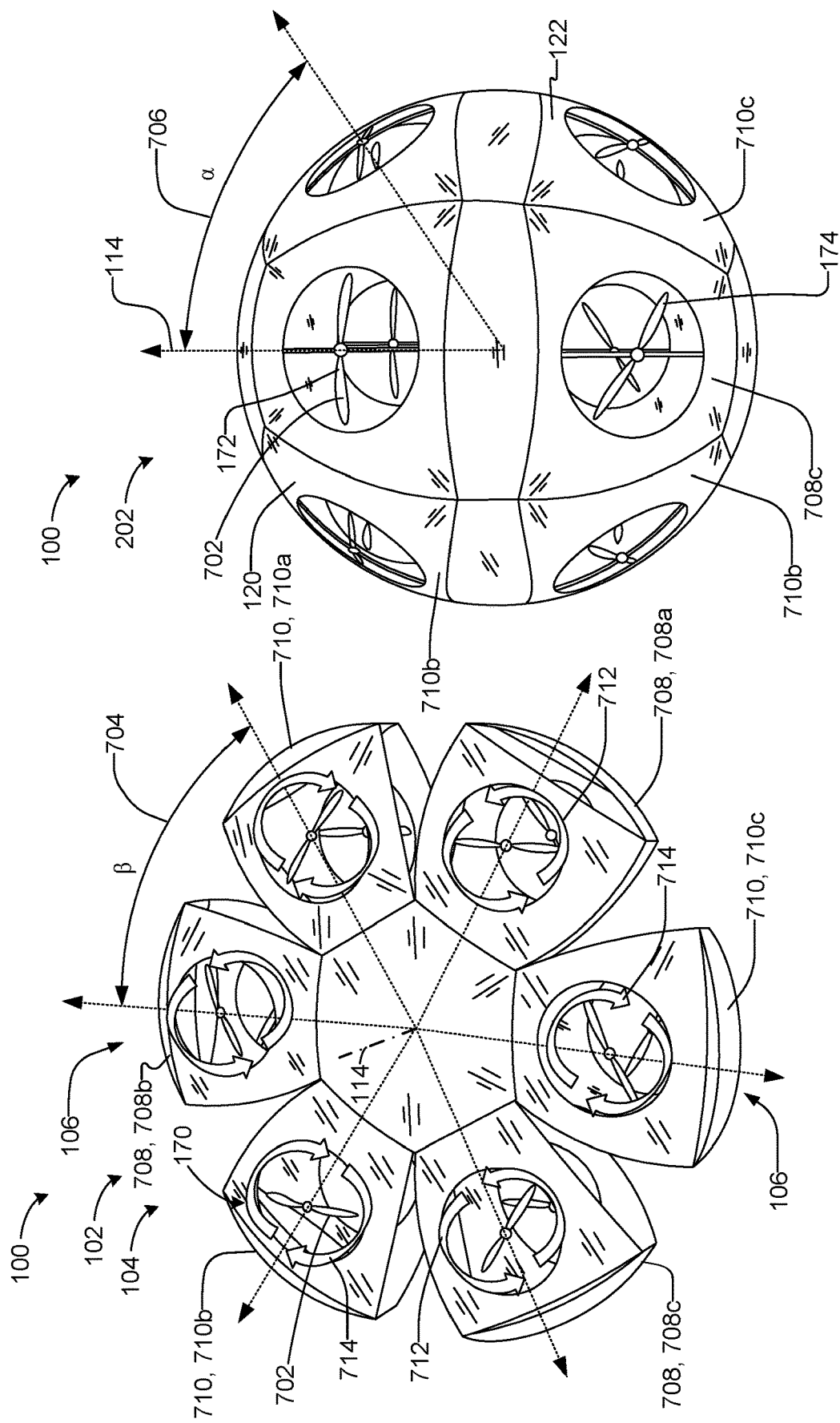

TRANSFORMABLE UNMANNED VEHICLES AND RELATED METHODS

FIELD OF THE DISCLOSURE

This disclosure relates generally to unmanned vehicles, and, more particularly, to transformable unmanned vehicles and related methods.

BACKGROUND

Over the years, unmanned vehicles or drones have become increasingly sophisticated. For example, some unmanned vehicles can perform both aerial and land missions.

BRIEF DESCRIPTION OF THE DRAWINGS

FIG. 7A is another view of the example vehicle shown in the example first configuration.

FIG. 7B is yet another view of the example vehicle shown in the example second configuration.

Figure 1A:
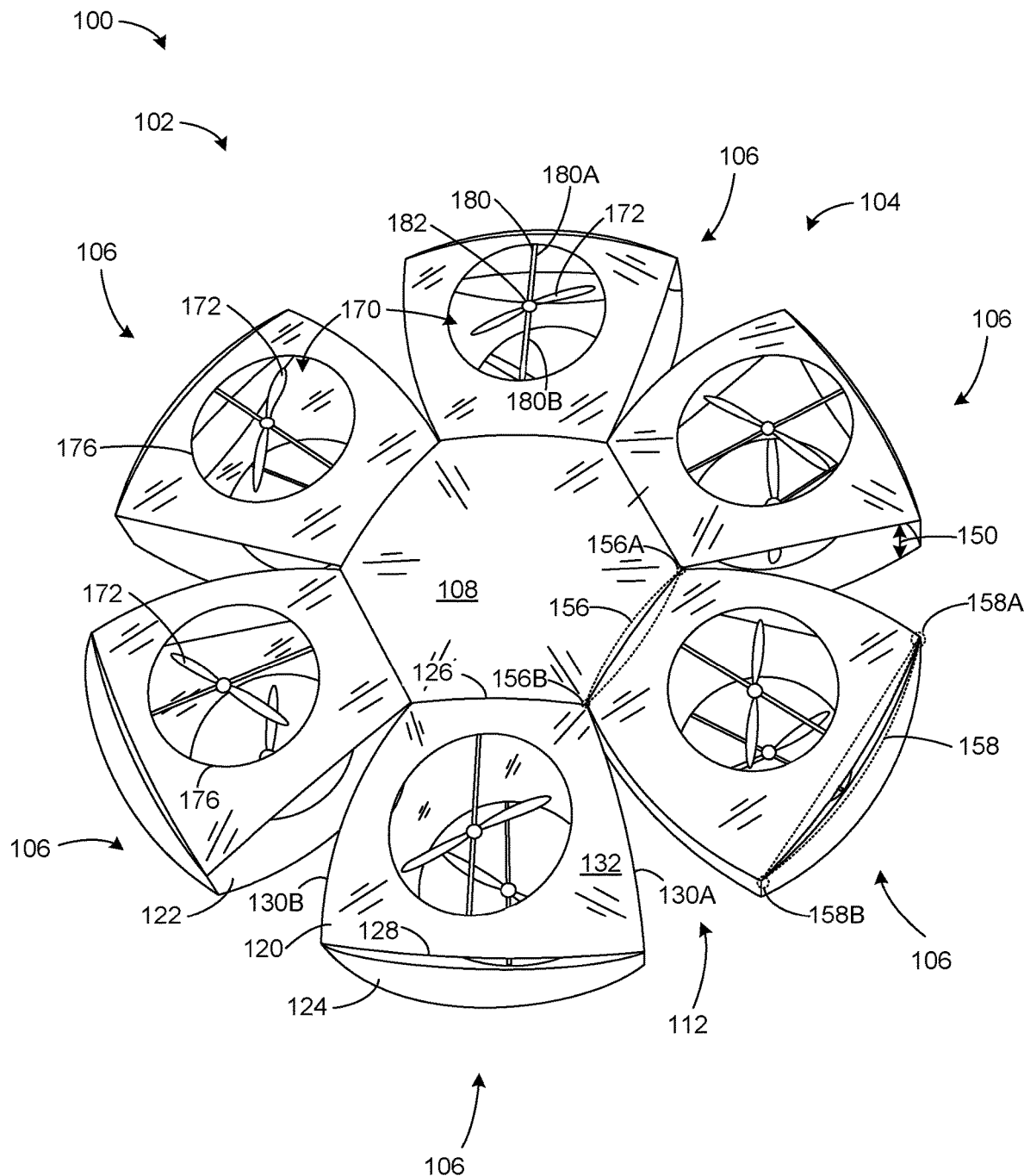
FIG. 1A is a top, perspective view of an example vehicle constructed in accordance with the teachings of this disclosure and shown in a first configuration.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Stating that a part is coupled or connected to another part indicates that the parts are jointed directly or through one or more intervening parts. Thus, physical contact is not required for two parts to be coupled or connected.

It should be noted that the drawing figures may be in simplified form and might not be to precise scale. In reference to the disclosure herein, for purposes of convenience and clarity only, directional terms, such as, up, upper, top, down, lower, bottom, left, right, over, above, below, beneath, rear, front, distal, and proximal are used with respect to the accompanying drawings. Such directional terms should not be construed to limit the scope of the invention in any manner.

DETAILED DESCRIPTION

Unmanned vehicles or drones employ high-performance electronic device(s) or component(s) such as, for example, a camera(s) (e.g., 3-D camera), a sensitive or delicate payload (e.g., a sensor(s)), electronics, etc. Such high-performance electronic device(s) or component(s) are typically exposed and may be prone to contact with and may sustain damage from external objects.

Example unmanned vehicles or drones disclosed herein protect rotor(s), propeller(s) and/or high-performance electronic device(s) or component(s) from damage. To project high-performance electronic device(s) or component(s) from damage, example vehicles disclosed herein transform between a first configuration and a second configuration different from the first configuration. For example, example unmanned vehicles disclosed herein can change shapes (e.g., dimensional characteristic(s) or profile(s)). For example, in the first configuration, example vehicles disclosed herein may have a disk shape configuration. In the first configuration, the vehicles disclosed herein may have a substantially flat (e.g., disk) or circular shape or profile. In the second configuration, example vehicles disclosed herein may have a ball or sphere configuration. Thus, example vehicles disclosed herein may transform between a disk or substantially flat configuration and a ball or sphere configuration. To enable transformation between the first and second configurations, a body of the example unmanned vehicles disclosed herein is configurable between a disk shape or drone shape (e.g., the first configuration or the disk configuration) and a ball or spherical shape (e.g., the second configuration). Thus, example unmanned vehicles disclosed herein include a body that can have different geometric shapes (e.g., a disk, a sphere, etc.).

To allow transformation between a multirotor configuration and sphere configuration, example vehicles disclosed herein employ mechanical components (e.g., movable joints, springs, actuators, etc.), geometric properties and/or shapes and/or deformable material(s) (e.g., shape memory alloy, elastomeric material(s), etc.).

In some instances, in both the first configuration (e.g., the multirotor configuration) and the second configuration (e.g., the sphere configuration), example vehicles protect rotor(s) or propeller(s) from damage. In some examples, the first configuration may expose one or more high-performance electronic device(s) or component(s) (e.g., a sensor, a camera, etc.) and a second configuration encloses (e.g., or protects from damage) the one or more high-performance electronic device(s) or component(s) (e.g., board sensors, cameras, electronics, etc.).

Example vehicles disclosed herein may be hybrid vehicles that provide dual modes of operation. In particular, example vehicles disclosed herein may operate between a first mode of operation and a second mode of operation different than the first mode of operation. In the first mode of operation, example vehicles disclosed herein operate in an aerial mode of operation (e.g., fly in the air) for aerial locomotion. In the second mode of operation, example vehicles disclosed herein operate in a terrestrial mode of operation to traverse a ground (e.g., roll across a terrain).

Example vehicles disclosed herein can operate in the first mode of operation (e.g., are flight capable) in both the first configuration (e.g., a disk configuration) and the second configuration (e.g., a sphere configuration). Additionally, example vehicles disclosed herein operate in the second mode of operation (e.g., terrestrial operation) in the second configuration.

Additionally, example vehicles disclosed herein employ the same rotor(s) or propeller(s) when operating in the first mode of operation and the second mode of operation. Thus, example vehicles disclosed herein need not employ additional and/or different rotor(s) or propeller(s) when operating in the first mode of operation (e.g., aerial mode) or in the second mode of operation (e.g., ground mode). In some instances, example vehicles disclosed herein adjust an angular velocity of one or more rotor(s) or propeller(s) to enable the vehicles disclosed herein to fly in the air when the vehicles are in the first mode of operation, and traverse (e.g., roll across) the ground when the vehicles are in the second mode of operation (e.g., ground mode).

Figure 1B:
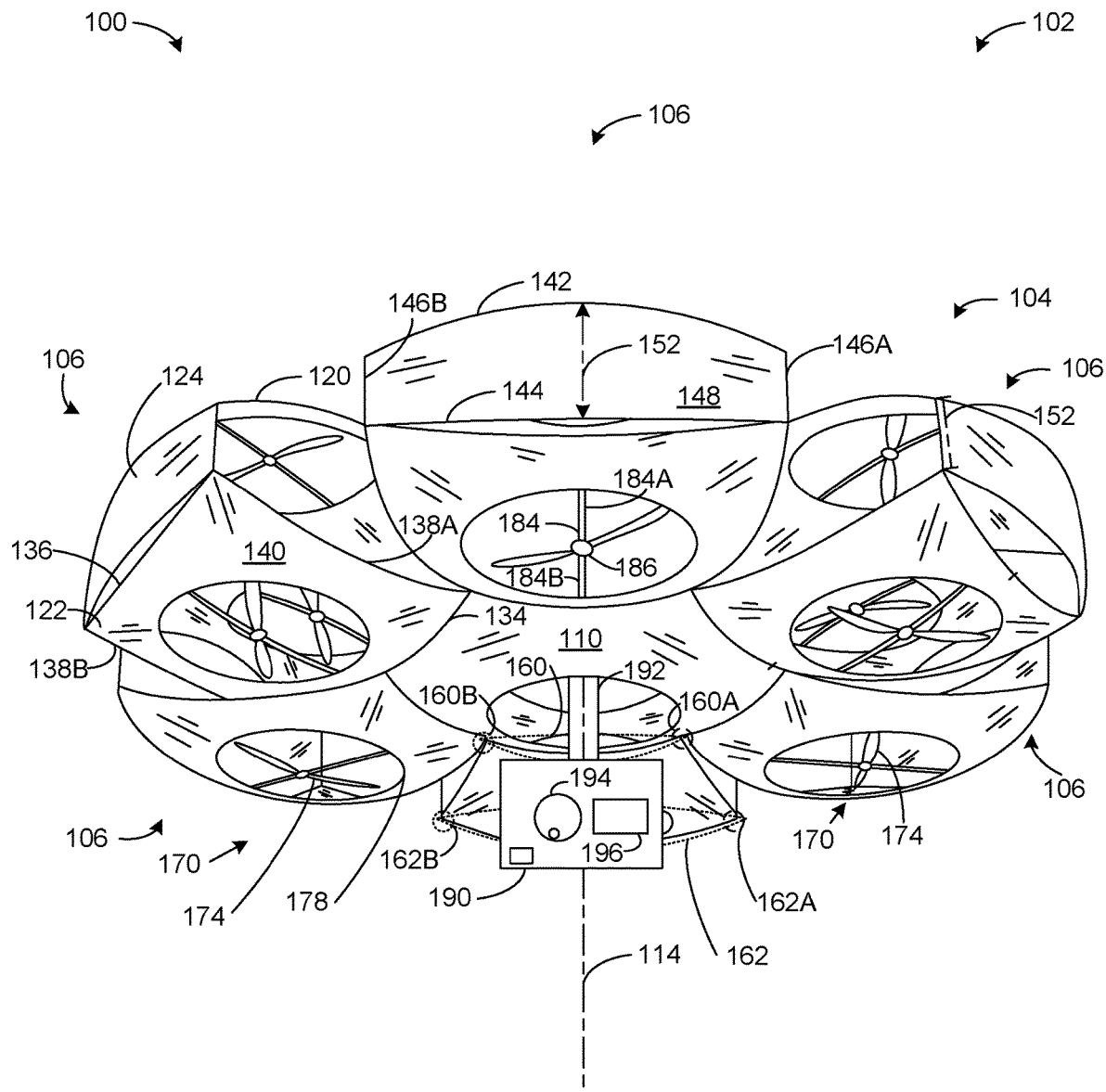
FIG. 1B is a bottom, perspective view of the example vehicle of FIG. 1A shown in the example first configuration.

FIG. 1A is at top, perspective view of an example unmanned vehicle 100 (e.g., a drone) constructed in accordance with the teachings of this disclosure. FIG. 1B is bottom, perspective view of the example vehicle 100 of FIG. 1A. Referring to FIGS. 1A and 1B, the vehicle 100 of the illustrated example is a transformable vehicle. Specifically, the vehicle 100 of the illustrated example transforms or converts between a first configuration 102 shown in FIGS. 1A and 1B and a second configuration 202 shown in FIGS. 2A and 2B. In the first configuration 102, the vehicle 100 of the illustrated example has a disk shape configuration (e.g., a substantially flat profile, a saucer shape, etc.). For example, in the first configuration 102, the vehicle 100 of the illustrated example has a disk-shaped profile. In the second configuration 202, the vehicle 100 of the illustrated example has a sphere or ball shaped configuration. Thus, the vehicle 100 of the illustrated example changes shapes between a disk shape and a sphere shape.

Additionally, the vehicle 100 of the illustrated example is a hybrid vehicle that can operate in a first mode of operation (e.g., an aerial mode) or a second mode of operation (e.g., a terrestrial mode) different than the first mode of operation. In the first configuration 102, the vehicle 100 of the illustrated example operates in the first mode of operation as an aerial drone. In the second configuration 202, the vehicle 100 of the illustrated example can operate in either the first mode of operation as an aerial drone or the second mode of operation as a land drone.

Figure 2A:
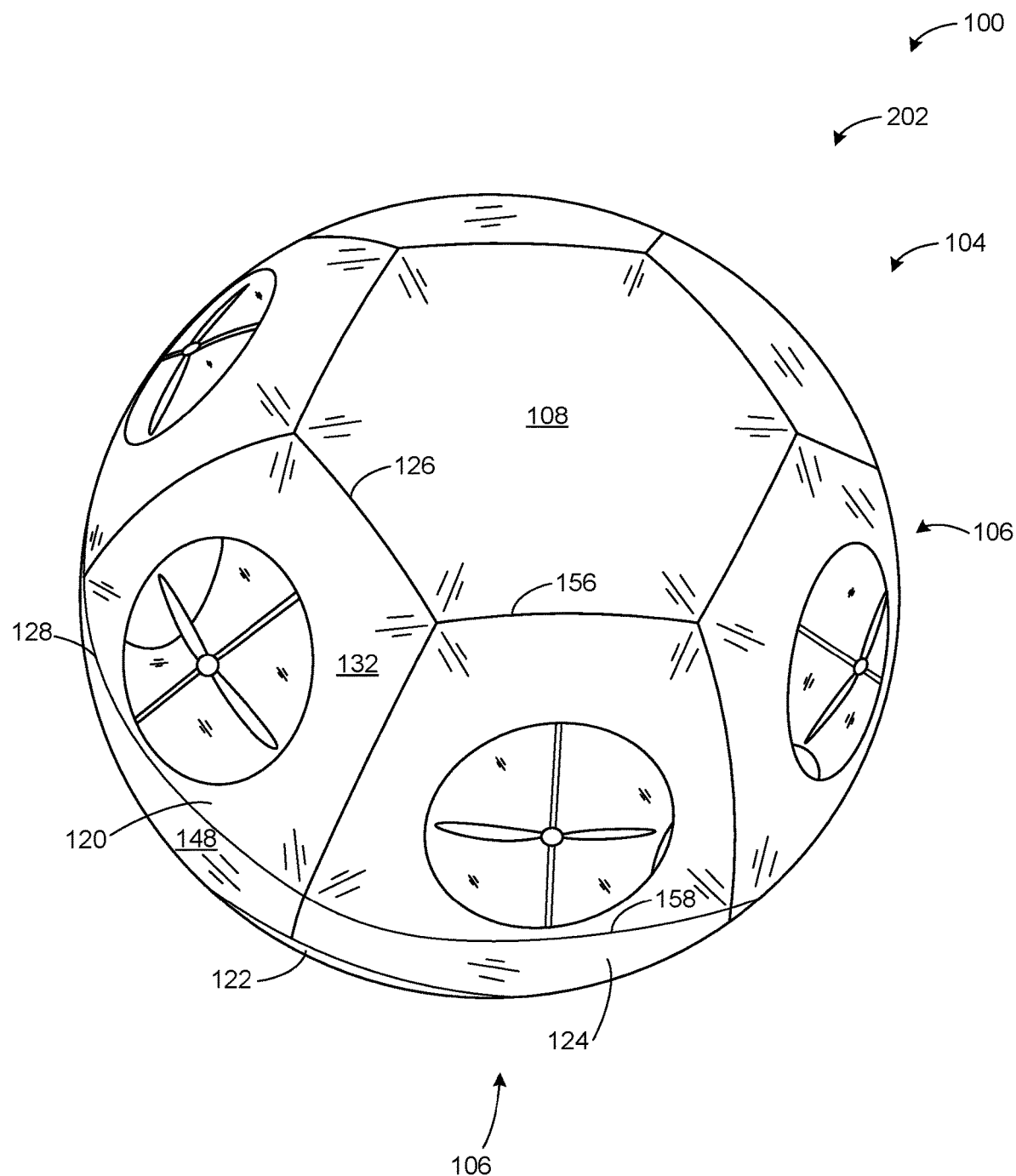
FIG. 2A is a top, perspective view of the example vehicle of FIGS. 1A and 1B shown in an example second configuration.
Figure 2B:
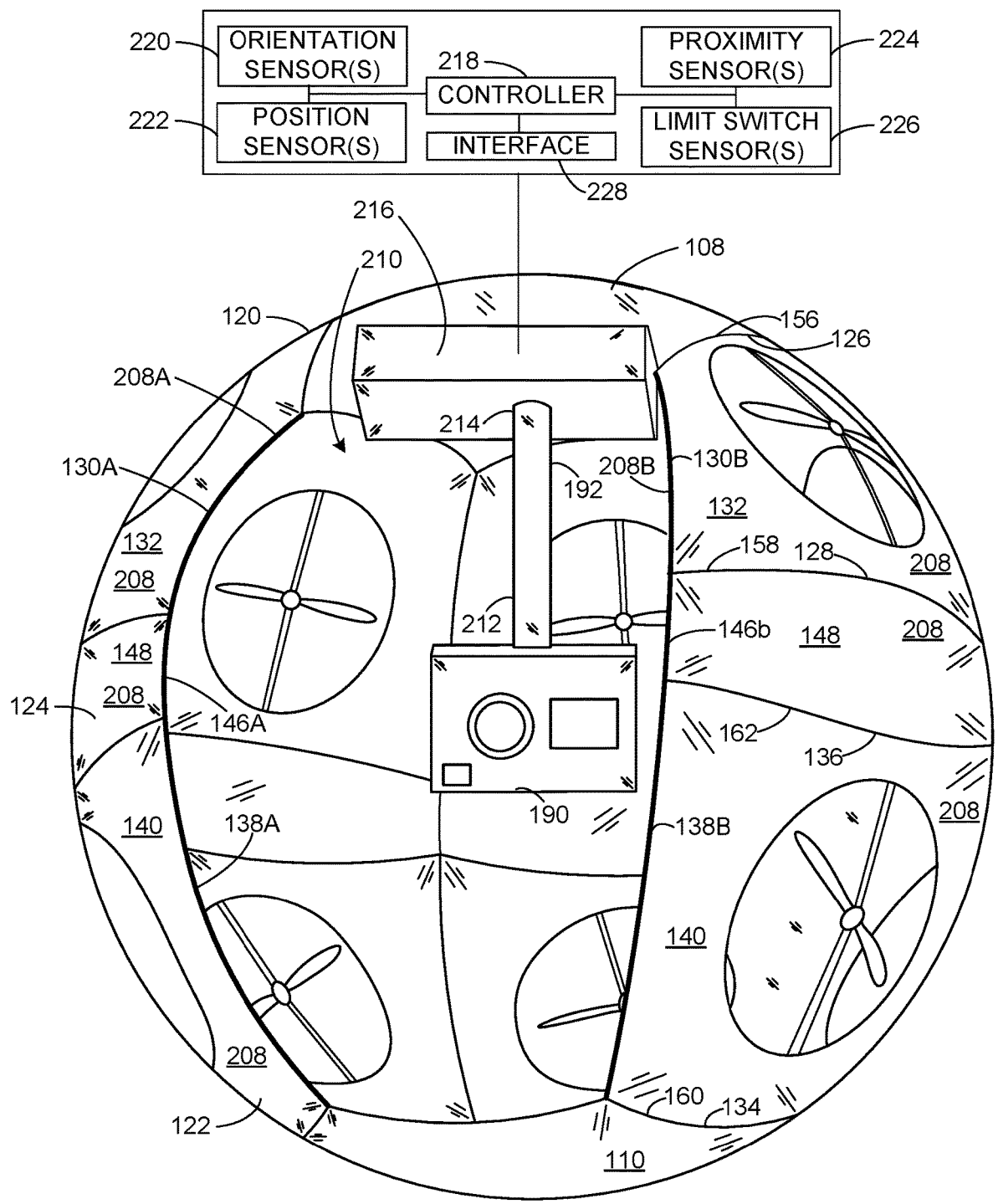
FIG. 2B is a cutaway side view of the example vehicle of FIG. 2A shown in the example second configuration.

To transform the vehicle 100 of the illustrated example between the first configuration 102 of FIGS. 1A and 1B and the second configuration 202 of FIGS. 2A and 2B, the vehicle 100 of the illustrated example includes a body 104 having a plurality of segments 106. For example, the body 104 of the illustrated example has six segments 106. However, in some examples, the body 104 may include less than six segments or more than six segments. The segments 106 of the illustrated example are identical in structure relative to each other. For example, each of the segments 106 of the illustrated example has the same or identical dimensional characteristic(s), shape(s) and/or profile(s). However, in some examples, a structure or profile of one or more of the segments 106 may be different than a profile or structure of another one of the segments 106.

To transform the vehicle 100 between the first configuration 102 shown in FIGS. 1A and 1B and a second configuration 202 (e.g., a sphere configuration) shown in FIG. 2, each of the segments 106 of the illustrated example is movable relative to a first or upper cap 108 (e.g., a top cap in the orientation of FIG. 1A) and a second or lower cap 110 (e.g., a bottom cap in the orientation of FIG. 1B). Additionally, each of the segments 106 is spaced from each other to define a gap 112 between adjacent segments 106. The segments 106 of the illustrated example are radially spaced (e.g., at 60-degree intervals) relative to a longitudinal axis 114 (e.g., a center axis) of the vehicle 100.

Each of the segments 106 of the illustrated example includes an upper section 120, a lower section 122, and an intermediate section 124 positioned between the upper section 120 and the lower section 122. The respective ones of the upper section 120 of the illustrated example includes a first or proximal end 126, a second or distal end 128, and side or lateral ends 130a-b that define an outer surface 132 of the upper section 120. The respective ones of the lower section 122 of the illustrated example includes a first or proximal end 134, a second or distal end 136, and side or lateral ends 138a-b that define an outer surface 140 of the lower section 122. The respective ones of the intermediate section 124 of the illustrated example includes a first or upper portion 142, a second or lower portion 144, and lateral ends 146a-b that define an outer surface 148 of the intermediate section 124. In the orientation of FIGS. 1A and 1B, the outer surface 132 of the upper section 120 is oriented in an opposite direction relative to an orientation of the outer surface 140 of the lower section 122. The outer surface 148 of the intermediate section 124 is oriented non-parallel (e.g., substantially perpendicular) relative to the outer surface 132 of the upper section 120 and the outer surface 140 of the lower section 122.

The upper section 120 and the lower section 122 of the illustrated example have a trapezoidal profile or shape (e.g., with the distal ends 128, 136 being longer than the proximal ends 126, 134). The intermediate section 124 has a rectangular shape or profile (e.g., with the upper and lower portions 142, 144 being longer than the lateral ends 146a-b). However, in some examples, the upper section 120, the lower section 122 and/or the intermediate section 124 may have a triangular profile, a rectangular profile, a square profile and/or any other shape or profile. Additionally, each of the upper section 120 and the lower section 122 has an arcuate profile or shape between the respective proximal ends 126, 134 and the distal ends 128, 136. For example, the upper section 120 bows upwardly in the orientation of FIG. 1A between the proximal end 126 and the distal end 128 and the lower section 122 bows downwardly in the orientation of FIG. 1B between the proximal end 134 and the distal end 136.

In the first configuration, the upper section 120 of the illustrated example is spaced from the lower section 122 by a distance 150 (e.g., a vertical distance). In particular, the upper section 120 of the illustrated example is spaced from the lower section 122 of the illustrated example by at least a distance 152 (e.g., a vertical height) defined between the upper portion 142 and the lower portion 144 of the intermediate section 124. Further, in the first configuration 102, the respective lateral edges 130a-b of the upper section 120 and the lateral edges 138a-b of the lower section of a respective one of the segments 106 are not coupled to and/or do not engage respective lateral edges 130a-b of the upper section 120 and the lateral edges 138a-b of the lower section 122 of an adjacent respective one of the segments 106.

The upper section 120 of the illustrated example is movably coupled to the upper cap 108 and the intermediate section 124. To movably couple the upper section 120 relative to the upper cap 108 and the intermediate section 124, the upper section 120 of the illustrated example is pivotally coupled (e.g., pivotally joined) to the upper cap 108 at a first junction 156 and the upper section 120 of the illustrated example is pivotally coupled (e.g., pivotally joined) to the upper portion 142 of the intermediate section 124 via a second junction 158. The first junction 156 of the illustrated example is provided at a first interface defined by the proximal end 126 of the upper section 120 and the upper cap 108 and the second junction of the illustrated example is provided at a second interface defined by the distal end 128 of the upper section 120 and the upper portion 142 of the intermediate section 124. In some examples, the first junction 156 includes a movable joint at the first interface between a first corner 156a and a second corner 156b of the upper section 120 and the second junction 158 includes a movable joint at the second interface between a third corner 158a and a fourth corner 158b of the upper section 120. In some examples, each of the corners 156a-b and 158a-b includes a movable joint. The movable joints enable the upper section 120 to move relative to the upper cap 108 and the intermediate section 124.

Similarly, the lower section 122 of the illustrated example is movably coupled relative to the lower cap 110 and the intermediate section 124. To movably couple the lower section 122 relative to the lower cap 110 and/or the intermediate section 124, the lower section 122 of the illustrated example is pivotally coupled to the lower cap 110 at a third junction 160 and the lower section 122 of the illustrated example is coupled to the intermediate section 124 at a fourth junction 162. For example, proximal end 134 of the lower section 122 of the illustrated example is pivotally coupled to the lower cap 110 at the third junction 160 and the distal end 136 of the lower section 122 of the illustrated example is pivotally coupled to the lower portion 144 of the intermediate section 124 via the fourth junction 162. The third junction 160 of the illustrated example is provided at a third interface defined by the proximal end 134 of the lower section 122 and the lower cap 110 and the fourth junction 162 of the illustrated is provided at a fourth interface defined by the distal end 136 of the lower section 122 and the lower portion 144 of the intermediate section 124. In some examples, the third junction 160 includes a movable joint at the third interface between a first corner 160a and a second corner 160b of the lower section 122 and the fourth junction 162 includes a movable joint at the fourth interface between a third corner 162a and a fourth corner 162b of the lower section 122. In some examples, each of the corners 160a-b and 162a-b include a movable joint. The movable joints enable the lower section 122 to move relative to the lower cap 110 and the intermediate section 124.

In some examples, the movable joints may be a spring-loaded hinge (e.g., a movable joint 300 of FIG. 3), a non-spring-loaded hinge, a ball-and-socket joint (e.g., positioned at the corners 156a-b, 158a-b, 160a-b and/or 162a-b), a pivot joint, and/or any other suitable fastener and/or joint to enable movement between two component(s). In some examples, the segments 106, the upper cap 108, the lower cap 110, and the movable joints provide means for forming the body 104 that is transformable between a first or disk shape configuration and a second or sphere shape configuration.

To generate lift, a rolling torque and/or to maneuver the vehicle 100, the vehicle 100 of the illustrated example includes a propulsion system. The propulsion system of the illustrated example includes a plurality of rotor assemblies 170. More specifically, each of the segments 106 of the illustrated example includes a rotor assembly 170. Each rotor assembly 170 of the illustrated example includes a first rotor 172 (e.g., a first propeller driven by a first motor) and a second rotor 174 (e.g., a second propeller driven by a second motor). More specifically, the first rotor 172 is associated with the upper section 120 of the segment 106 and the second rotor 174 of the illustrated example is associated with the lower section 122 of the segment 106. The first rotor 172 of the illustrated example is positioned relative to a first opening 176 of (e.g., formed through) the upper section 120 and the second rotor 174 of the illustrated example is positioned relative to a second opening 178 of (e.g., formed through) the lower section 122. For example, in the first configuration 102, the first opening 176 and/or the first rotor 172 of the illustrated example is aligned (e.g., coaxially aligned) with the second opening 178 and/or the second rotor 174. However, in some examples, the first opening 176 and/or the first rotor 172 associated with the upper section 120 may be offset relative to the second opening 178 and/or the second rotor 174 associated with the lower section 122. Each of the first and second rotors 172, 174 (e.g., a propeller) of the illustrated example includes a propeller or blade that is driven by a respective motor (e.g., an electric motor such as a direct current (DC) motor) to generate lift and/or maneuver the vehicle 100. Thus, the first and second rotors 172 and 174 provide means for generating lift to the body 104 of the vehicle 100. Rotation of the first rotor 172 of the upper section 120 and the second rotor 174 of the lower section 122 of the segments 106 generate thrust and reaction torques that enable operation and maneuverability of the vehicle 100. FIGS. 7A, 7B, 8 and 9 below describe the rotation of the first and second rotors 172 and 174 of the upper and lower sections 120 and 122. In some examples, the propulsion system (e.g., the rotor assemblies) provide means for generating lift to enable the body 104 to operate in a first mode of operation (e.g., an aerial mode) when the body 104 is in the first or disk configuration and the second or sphere configuration, and provide means for generating a rolling torque to enable the body 104 to operate in a second mode of operation (e.g., a ground mode) when the body 104 is in the second or sphere configuration. Thus, the same propulsion system of the vehicle 100 of the illustrated example provides means for generating lift and means for providing a rolling torque.

To support the first rotor 172 relative to the upper section 120, the vehicle 100 of the illustrated example includes a first support beam 180. More specifically, first rotor 172 of the illustrated example is coupled or attached to the first support beam 180. The first support beam 180 of the illustrated example extends across the first opening 176 of the upper section 120. More specifically, the first support beam 180 of the illustrated example extends across the first opening 176 between the proximal end 126 and the distal end 128 of the upper section 120. The first support beam 180 of the illustrated example includes ends 180a, 180b that are coupled to the upper section 120 (e.g., adjacent a perimeter of the upper section 120 defining first opening 176). The first support beam 180 of the illustrated example includes a hub 182 to attach the first support beam 180 to the first rotor 172 (e.g., via a fastener, a clamp, a chemical fastener, etc.). For example, the hub 182 may attach to a motor of the first rotor 172 or a cap of a propeller of the first rotor 172.

In some examples, the first support beam 180 may include a plurality of radially spaced arms (e.g., six arms, eight arms, 10 arms, etc.) extending from the hub 182 (e.g., a web configuration) that are attached to the upper section 120 (e.g., adjacent a perimeter of the upper section 120 defining first opening 176). In some examples, the first rotor 172 may be cantilevered relative to the first opening 176 via the first support beam 180 (e.g., only one arm extending from the hub 182).

Similarly, to support the second rotor 174 relative to the lower section 122, the vehicle 100 of the illustrated example includes a second support beam 184. More specifically, the second rotor 174 of the illustrated example is coupled or attached to the second support beam 184. The second support beam 184 of the illustrated example extends across the second opening 178 of the lower section 122. More specifically, the second support beam 184 of the illustrated example extends across the second opening 178 between the proximal end 134 and the distal end 136 of the lower section 122. The second support beam 184 of the illustrated example includes ends 184a, 184b that are coupled to the lower section 122 (e.g., adjacent a perimeter of the lower section 122 defining second opening 178). The second support beam 184 of the illustrated example includes a hub 186 to attach the second support beam 184, the second rotor 174 (e.g., via a fastener, a clamp, a chemical fastener, etc.). For example, the hub 186 may attach to a motor of the second rotor 174 or a cap of a propeller of the second rotor 174.

In some examples, the hub 186 includes a plurality of radially spaced arms (e.g., six arms, eight arms, 10 arms, etc.) extending from the hub 186 (e.g., a web configuration) that are attached to the lower section 122 (e.g., adjacent a perimeter of the lower section 122 defining the second opening 178). In some examples, the second rotor 174 may be cantilevered relative to the second opening 178 via the second support beam 184 (e.g., via only one arm extending from the hub 186).

The first support beam 180 of the illustrated example may be formed during formation of the first opening 176 of the upper section 120 and the second support beam 184 of the illustrated example may be formed during formation of the second opening 178 of the lower section 122. In some examples, the first support beam 180 may be coupled or attached (e.g., via mechanical fasteners) to the upper section 120 and/or the second support beam 184 may be coupled or attached to the lower section 122 (e.g., via mechanical fasteners).

To protect the first rotor 172 and the second rotor 174 from damage, a propeller of the first rotor 172 of the illustrated example is recessed or offset relative to (e.g., beneath in the orientation of FIG. 1A) the outer surface 132 of the upper section 120 and a propeller of the second rotor 174 of the illustrated example is recessed or offset relative to (e.g., above in the orientation of FIG. 1B) the outer surface 140 of the lower section 122. In other words, the first support beam 180 is positioned between a propeller of the first rotor 172 and the outer surface 132 of the upper section 120, and the second support beam 184 is positioned between a propeller of the second rotor 174 and the outer surface 140 of the lower section 122.

Additionally, the first support beam 180 and/or the second support beam 184 of the illustrated example may have an arcuate or curved profile (e.g., between the respective proximal ends 126, 134 and the distal ends 128, 136) to match a contour or shape of the respective outer surfaces 132 and 140. In some examples, the first support beam 180 may define a portion of the outer surface 132 of the upper section 120 and the second support beam 184 may define a portion of the outer surface 140 of the lower section 122. In other words, an outermost surface of the first support beam 180 may be substantially flush relative to the outer surface 132 of the upper section 120 and an outermost surface of the second support beam 184 may be substantially flush relative to the outer surface 140 of the lower section 122.

In some examples, a mesh-shaped structure or material (e.g., a mesh screen) may be formed or provided across the first opening 176 and/or the second opening 178 to prevent debris from entering the first opening 176 and the second opening 178. In some examples, a mesh-shaped structure or material (e.g., mesh screen) may be formed or provided between the lateral edges 130a and 138a, and 130b and 138b of the respective upper section 120 and the lower section 122 to prevent unwanted debris from entering the body 104 via the gap 112 and/or sides of the segments 106.

Referring to FIG. 1B, the vehicle 100 of the illustrated example includes a payload 190. Specifically, the payload 190 of the illustrated example is suspended from the upper cap 108 via a post 192. The payload 190 of the illustrated example includes a camera 194, a sensor 196 (e.g., an infrared sensor, a proximity sensor, etc.), and/or any other suitable high-performance electronic device(s) or component(s). In some examples, the payload 190 may be removably coupled to the post 192. In such examples, the payload 190 may be interchanged with another payload. In the first configuration 102, the payload 190 of the illustrated example is exposed relative to the segments 106 of the vehicle 100. More specifically, the payload 190 projects from the lower cap 110.

FIG. 2A illustrates the vehicle 100 of the illustrated example in the second configuration 202. FIG. 2B is a partial, cut-away view of the vehicle 100 in the second configuration 202. The body 104 of the illustrated example of FIGS. 2A and 2B is transformed into a sphere or a ball. To transform the body 104 between the first configuration 102 and the second configuration 202, the upper section 120 of the segments 106 pivots relative to the upper cap 108 and the intermediate section 124, and lower section 122 of the segments 106 pivots relative to the lower cap 110 and the intermediate section 124. As noted above, the first junction 156 between the upper section 120 and the upper cap 108 and the second junction 158 between the upper section 120 and the intermediate section 124 include movable joints (e.g., spring-loaded hinges) that enable pivotal movement of the upper section 120 relative to the upper cap 108 and the intermediate section 124. Likewise, the third junction 160 between the lower section 122 and the lower cap 110 and the fourth junction 162 between the lower section 122 and the intermediate section 124 includes movable joints (e.g., spring-loaded hinges) that enable pivotal movement of the lower section 122 relative to the lower cap 110 and the intermediate section 124.

In the second configuration 202, the lateral edges 130a, 146a, 138a of respective upper section 120, the intermediate section 124 and the lower section 122 align to form continuous arcuate or curved profile 208a (e.g., a smooth profile) and the lateral edges 130b, 146b, 138b of respective upper section 120, the intermediate section 124 and the lower section 122 align to form continuous arcuate or curved profile 208b (e.g., a smooth profile) between the upper cap 108 and the lower cap 110. In other words, the outer surface 132 of the upper section 120, the outer surface 148 of the intermediate section 124, and the outer surface 140 of the lower section 122 define a continuous or smooth outer surface 208 (e.g., a sphere or ball) of the body 104 between the upper cap 108 and the lower cap 110. To this end, the gap 112 (FIGS. 1A and 1B) between the segments 106 provided when the body 104 is the first configuration 102 is substantially reduced (e.g., eliminated) in the second configuration 202. For example, the lateral edges 130a, 146a, 138a of the respective upper section 120, the intermediate section 124 and the lower section 122 of a first one of the segments 106 abut or engage the lateral edges 130b, 146b, 138b of respective upper section 120, the intermediate section 124 and the lower section 122 of a second one of the segments 106 immediately adjacent the respective first one of the segments 106.

Referring to FIG. 2B, the payload 190 of the illustrated example is positioned within a cavity 210 (e.g., a cage) of the body 104 formed by the segments 106 between the upper cap 108 and the lower cap 110 when the body 104 is in the second configuration 202. In other words, the payload 190 is encased, surrounded or otherwise positioned in the cavity 210 defined by the segments 106, the upper cap 108 and the lower cap 110. In this manner, the body 104 protects the payload 190 from damage and/or is not exposed from a perimeter or dimensional envelope of the body 104.

As noted above, the payload 190 of the illustrated example is suspended or cantilevered from the upper cap 108 via the post 192. The post 192 of the illustrated example has a first end 212 coupled to the payload 190 and a second end 214 coupled to a housing 216. The housing 216 of the illustrated example is coupled or attached to the upper cap 108. The post 192 of the illustrated example has a length to provide the payload 190 at an elevation that is aligned with the intermediate section 124 when the body 104 is in the second configuration 202. In some such examples, the intermediate section 124 may be transparent such that the payload 190 (e.g., a camera, a sensor, etc.) can see through the intermediate section 124 when the body 104 is in the second configuration 202. In this manner, a camera or other sensor can be used when the body 104 is in the second configuration 202. Additionally, the second configuration 202 of the vehicle 100 of the illustrated example provides a landing gear for the body 104. In other words, the vehicle 100 of the illustrated example lands when the body 104 is in the second configuration 202. In some examples, the payload 190 provides means for sensing coupled to the body 104, where the means for sensing is positioned inside the cavity 210 of the body 104 when the body 104 is in the second configuration 202 (e.g., the sphere configuration) and the means for sensing is positioned outside of the cavity 210 of the body 104 when the body 104 is in the first configuration 102 (e.g., the disk configuration).

To control operation and maneuverability of the vehicle 100, the housing 216 of the illustrated example includes a controller 218 (e.g., a processor and/or other electronic(s)). The controller 218, for example, employs a processor(s) that controls directional orientation of the vehicle 100 in the first mode of operation during flight and/or the second mode of operation when traveling on the ground.

To provide information indicative of the attitude or orientation of the vehicle 100 to the example controller 218, the vehicle 100 of the illustrated example is provided with one or more orientation sensor(s) 220. In some examples, the orientation sensor(s) 220 includes an inertial measurement unit (IMU) (e.g., an accelerometer(s), a gyroscope(s), a magnetic field sensor(s)) that computes for example, yaw, pitch and roll orientation values of the vehicle 100 using, for example, estimation techniques such as Kalman filtering, complementary filters, Mahony/Madgwick filters, etc. To provide information indicative of the position or location of the vehicle 100, the vehicle 100 of the illustrated example includes one or more position sensor(s) 222. The position sensor(s) 222 may include image sensors, a global position system (GPS), a Global Positioning Sensor (GPS) or chip, an altimeter for determining altitude, a depth camera and/or any other sensor device(s).

Additionally, as described in greater detail below in connection with FIGS. 4-6, the controller 218 of the illustrated example controls transformation of the body 104 of the vehicle 100 between the first configuration 102 and the second configuration 202. In some examples, the vehicle 100 of the illustrated example may include one or more proximity sensor(s) 224 that may be used by the controller 218 of the vehicle 100 to determine whether to transform the body 104 between the first configuration 102 and the second configuration 202. For example, the vehicle 100 of the illustrated example may employ one or more proximity sensor(s) 224 that detect a proximity of the body 104 relative to an external object. If the controller 218 determines that a proximity of the body 104 relative to the external object is less than a proximity threshold, the controller 218 may cause the body 104 to transform from the first configuration 102 to the second configuration 202 to protect the payload 190 from damage.

Additionally, the vehicle 100 of the illustrated example may include one or more switch sensors 226 to indicate whether the body 104 is in the first configuration 102 or the second configuration 202. For example, the switch sensor(s) 226 can include a limit switch, a photoelectric eye sensor, an image sensor, etc. For example, the switch sensor may be coupled to the upper cap 108, the lower cap 110, the upper section 120, the lower section 122 and/or the intermediate section 124 and/or any combination thereof.

The controller 218 of the illustrated example is provided with a communication interface 228 to enable communications with a remote operator. In some examples, control provided by the controller 218 is partially autonomous in that control is accomplished based on inputs from a remote operator as well as substantially real-time feedback from the orientation sensor(s) 220, the position sensor(s) 222, the proximity sensor(s) 224, etc. For example, the controller 218 may provide attitude control while a remote operator controls translational movement of the vehicle 100. Attitude control refers to the control or stabilization of the orientation of the vehicle 100 (e.g., about a first axis (e.g., yaw angle), a second axis (e.g., pitch angle) and a third axis (e.g., roll angle)).

Based on the values of the control inputs, the controller 218 of the illustrated example via, for example a model employed by the controller 218, produces corresponding outputs (e.g., total thrust, total force $T_{Fw}$, total torque $T_T$) used to control the vehicle 100 by, for example, adjusting the control inputs (e.g., torque and/or associated speed (e.g., angular velocity)) of each of the motors of the rotors 170. Any adjustments to the outputs, as well as external disturbances, may affect the states (e.g., position, speed, acceleration, orientation, angular rotation, etc.) of the vehicle 100, thereby giving rise to the need to adjust the control inputs.

In some examples, to stabilize and/or change the behavior (e.g., movement) of the vehicle 100, the controller 218 of the illustrated example employs one or more control laws to calculate the control inputs (e.g., angular velocity). The control law corresponds to mathematical expressions or relationships for the control variables in the model that are derived as a function of the vehicle states. Thus, the control laws may be used to generate updated control inputs (e.g., angular velocities) that may be iteratively analyzed in accordance with the model to continuously update the outputs and resulting states of the vehicle 100. Thus, the controller 218 of the illustrated example employs a control law to determine the angular velocity for each of the motors needed to move the vehicle 100 along an estimated trajectory path (e.g., provided by a model or trajectory planner) when the vehicle 100 of the illustrated example is in the first mode of operation (e.g., in flight) or the second mode of operation (e.g., roving on the ground). An example control system that may be employed to operate the vehicle 100 of the illustrated example is provided in connection with FIGS. 10-13.

Figure 3:
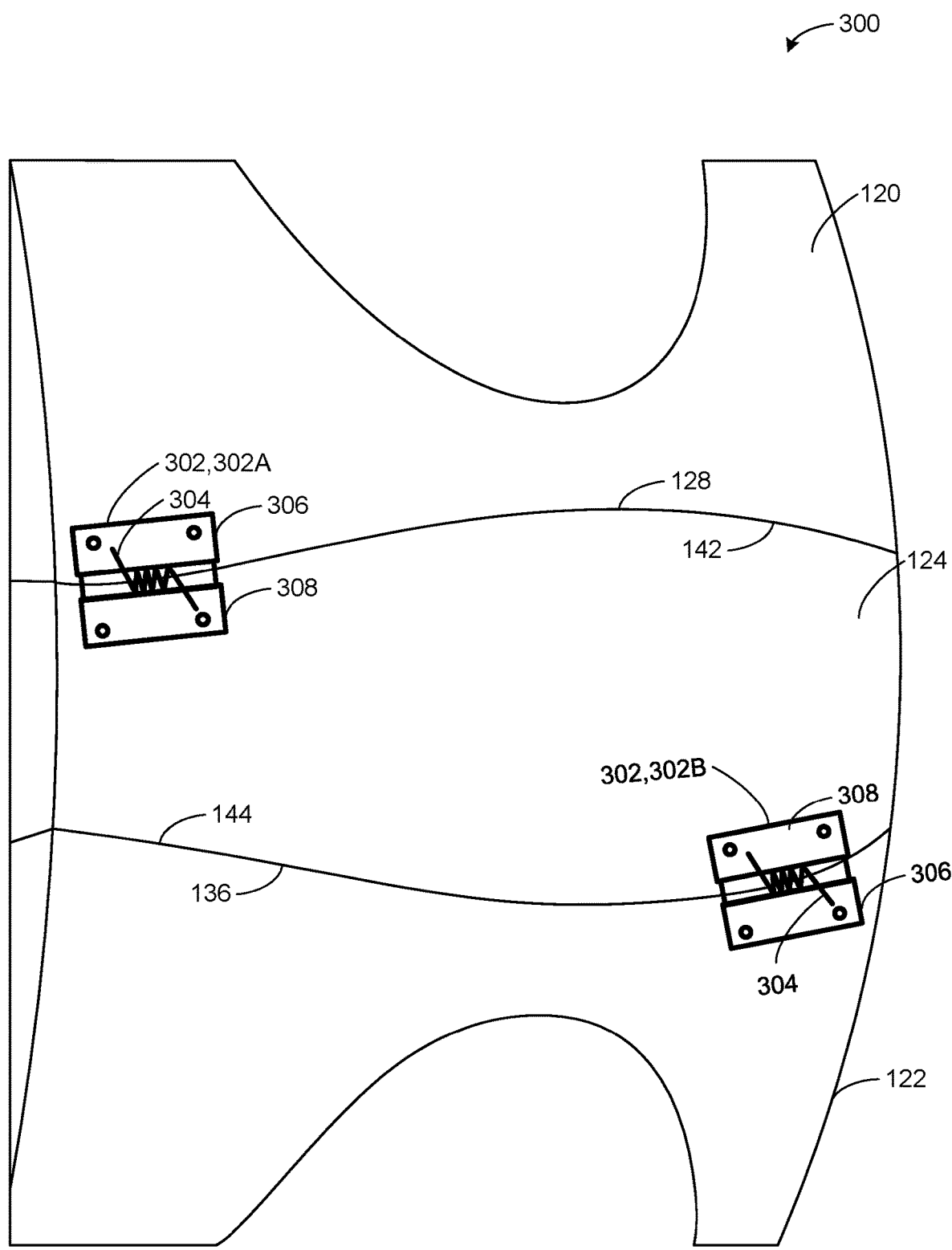
FIG. 3 is an example movable joint that may implement the example vehicle of FIGS. 1A, 1B, 2A and 2B.

FIG. 3 illustrates an example movable joint 300 that can implement the vehicle 100 of FIGS. 1A, 1B, 2A and 2B. For example, the movable joint 300 of the illustrated example is hinge 302 that includes a biasing element 304 (e.g., a spring-loaded hinge). The movable joint 300 of the illustrated example may be positioned at the interface 156 between the upper section 120 and the upper cap 108, the interface 158 between the upper section 120 and the intermediate section 124, the interface 160 between the lower section 122 and the lower cap 110, and/or the interface 162 between the lower section 122 and the intermediate section 124. The hinge 302 of the illustrated example includes a first flange 306 that is movable relative to a second flange 308.

As shown by way of example in FIG. 3, a first hinge 302a is coupled between the upper section 120 and the intermediate section 124 and a second hinge 302b is coupled between the lower section 122 and the intermediate section 124. For example, the first flange 306 of the first hinge 302a is coupled to the distal end 128 of the upper section 120 and the second flange 308 of the first hinge 302a is coupled to the upper portion 142 of the intermediate section 124. The first flange 306 of the second hinge 302b is coupled to the lower section 122 and the second flange 308 of the second hinge 302b is coupled to the intermediate section 124. When the body 104 transforms between the first configuration 102 and the second configuration 202, the first hinge 302a enables pivotal movement between the upper section 120 and the intermediate section 124 and the second hinge 302b enables pivotal movement between the lower section 122 and the intermediate section 124.

Figure 4:
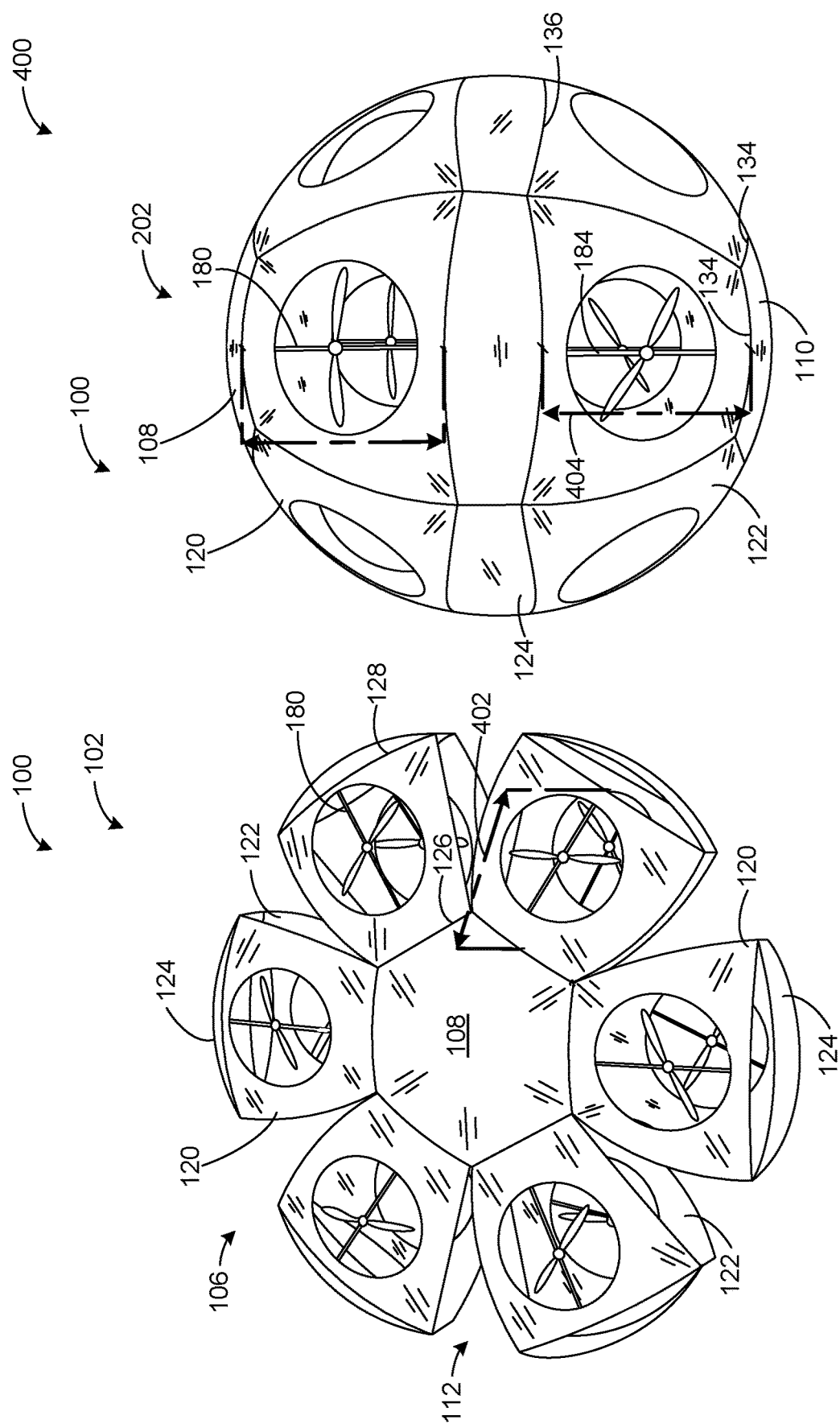
FIG. 4 is an example actuation system that may implement the example vehicle of FIGS. 1A, 1B, 2A and 2B.

FIG. 4 illustrates an example actuation system 400 that may be employed to transform the vehicle 100 between the first configuration 102 and the second configuration 202. The actuation system 400 of the illustrated example employs shape memory alloy. Specifically, the segments 106 of the vehicle 100 of the illustrated example employ shape memory alloy to actuate or transform the body 104 between the first configuration 102 and the second configuration 202. More specifically, at least a portion of the upper section 120 and at least a portion of the lower section 122 of the illustrated example are composed of shape memory alloy material(s). In some examples, the upper section 120 and the lower section 122 may be composed of a shape-memory alloy such as, for example, a copper-aluminum-nickel shape memory alloy or a nickel-titanium shape memory alloy and/or any other type of shape memory alloy material(s). The intermediate section 124 of the illustrated example is composed of a flexible, non-shape memory alloy material. However, in some examples, the intermediate section 124 may be composed of shape memory alloy material or a rigid, non-shape memory alloy material (e.g., plastic).

The shape memory alloy enables the upper and lower sections 120 and 122 of the segments 106 to deform relative to the upper cap 108 and the lower cap 110. For example, the shape memory alloy of the upper section 120 may be trained and/or configured to cause the upper section 120 of the segments 106 to extend in a lengthwise direction or retract in the lengthwise direction between the proximal end 126 and the distal end 128 of the upper section 120. Similarly, the shape memory alloy of the lower section 122 may be trained and/or configured to cause the lower section 122 of the segments 106 to extend in a lengthwise direction or retract in the lengthwise direction between the proximal end 134 and the distal end 136 of the lower section 122.

In this manner, the shape memory alloy enables the upper section 120 between the proximal end 126 and the distal end 128 to vary (e.g., increase or decrease) between a first length 402 when the body 104 is in the first configuration 102 and a second length 404 different than (e.g., greater than) the first length 402 when the body 104 is in the second configuration 202. Likewise, the shape memory alloy enables the lower section 122 between the proximal end 134 and the distal end 136 to vary (e.g., increase or decrease) between the first length 402 when the body 104 is in the first configuration 102 and the second length 404 when the body 104 is in the second configuration 202.

To vary the upper section 120 and the lower section 122 between the first length 402 and the second length 404, the vehicle 100 of the illustrated example applies or removes heat to the shape-memory alloy. For example, varying the upper and lower sections 120 and 122 via the shape memory alloy from the first length 402 (e.g., a position corresponding to the first configuration 102) to the second length 404 (e.g., a position corresponding to the second configuration 202) occurs in response to an application of heat to the shape memory alloy. Conversely, varying the upper and lower sections 120 and 122 via the shape memory alloy from the second length 404 (e.g., a position corresponding to the second configuration 202) to the first length 402 (e.g., a position corresponding to the first configuration 102) occurs in response to removal of the application of heat from the shape memory alloy. The implementation of the shape memory alloy as a mechanism for varying the first lengths 402 and the second lengths 404 of the upper and lower sections 120 and 122 advantageously provides for an actuation system having a reduced footprint, a reduced weight, a reduced number of movable components, and/or a reduced cost relative to other actuation systems (e.g., electric actuators, motors, transmissions, etc.) that may be implemented to transform the body 104 of the vehicle 100 between the first configuration 102 and the second configuration 202.

Additionally, the first support beam 180 and/or the second support beam 184 may be composed of a shape-memory alloy in addition to the at least the upper section 120 and the lower section 122. Alternatively, in some examples in which the first and second support beams 180 and 184 are do not employ shape memory alloy, the first support beam 180 and/or the second support beam 184 may be composed of an elastic or deformable material (e.g., a rubber) that can extend or retract when the body 104 moves between the first configuration 102 and the second configuration 202. Alternatively, the first support beam 180 and the second support beam 184 may be composed of a shape-memory alloy instead of the upper section 120 and the lower section 122. In some such examples, to support the varying length of the first support beam 180 and the second support beam 184, the upper section 120 and the lower section 122 may be composed of an elastic or deformable material (e.g., rubber) to enable the upper section 120 and the lower section 122 to extend or retract when the body 104 moves between the first configuration 102 and the second configuration 202 via the first and second support beams 180 and 184.

Alternatively, in some examples, the movable joint (e.g., the movable joint 300) may include shape memory alloy (e.g., instead of the upper section 120, the lower section 122 and/or the first and second support beams 180 and 184). For example, the first flange 306 and the second flange 308 of the hinge 302 may be composed of shape memory allow. In some such example, application of heat may cause the first flange 306 to move toward the second flange 308 causing the body 104 to move from the second configuration 204 to the first configuration 102. Removal of heat from the first flange 306 and the second flange 308 may allow the biasing element 304 to cause the first flange 306 to move away from the second flange 308, thereby causing the body 104 to expand between the first configuration 102 to the second configuration 202.

In some examples, movable joints (e.g., different than the movable joint 300) of the body 104 may be shape memory alloy. The movable joints may be trained to expand the body 104 to the second configuration 202 upon application of heat to the shape memory alloy and retract the body 104 to the first configuration 102 upon removal of heat to the shape memory alloy movable joint.

To transform the body 104 from the first configuration 102 to the second configuration 202, the controller 218 of the illustrated example provides electric power (e.g., a current, a voltage, etc.) to the shape memory alloy of the upper section 120 and the lower section 122. To transform the body 104 from the second configuration 202 to the first configuration 102, the controller 218 removes electric power (e.g., a current, a voltage, etc.) to the shape memory alloy of the upper section 120 and the lower section 122. The controller 218 can provide power to the shape memory alloy of the upper section 120 and the lower section 122 via conductive leads formed in the upper section 120 and the lower section 122. For example, the shape memory alloy of the upper section 120 and the lower section 122 may include one or more resistors electrically coupled to the controller 218 positioned in the housing 216. In some examples, the conductive leads and/or the resistors may be printed on an inner surface of the upper section 120 and an inner surface of the lower section 122.

Figure 5:
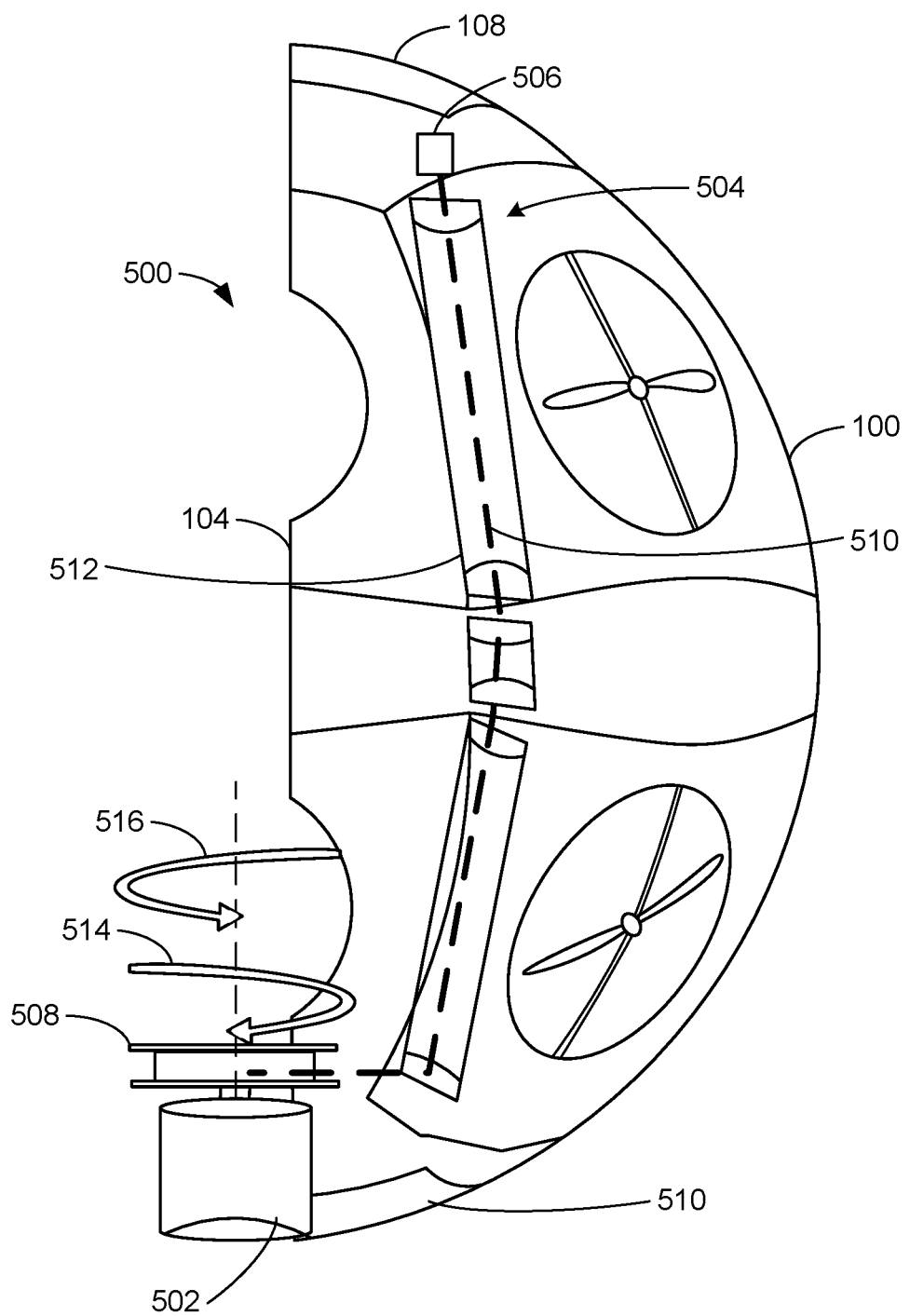
FIG. 5 is another example actuation system that may implement the example vehicle of FIGS. 1A, 1B, 2A and 2B.

FIG. 5 illustrates another example actuation system that may be used to implement the example vehicle 100 disclosed herein. The actuation system 500 of the illustrated causes the body 104 to transform between the first configuration 102 and the second configuration 202. The actuation system 500 of the illustrated example does not employ shape memory alloy. The actuation system 500 of the illustrated example includes a motor 502 and a transmission system 504. The transmission system 504 of the illustrated example includes a connector 506, a reel 508 and a coupler or connector 510. The connector 506 of the illustrated example is coupled to the upper cap 108. For example, the connector 506 is rigidly coupled or attached to the upper cap 108. In some examples, the connector 506 may be integrally formed with the upper cap 108 as a unitary piece or structure. In some example, the connector 506 may be a hasp, a lug, an anchor, a screw, and/or any other type of fastener(s) or coupler(s) that is coupled or formed with the upper cap 108. The connector 506 of the illustrated example is coupled to the reel 508 (e.g., a gear) via the connector 510. The connector 510 of the illustrated example is a cable. However, in other examples, the connector 510 may be a string, a wire, an elastic band, and/or any other transmission to operatively couple the reel 508 and the connector 506. The motor 502 of the illustrated example is positioned adjacent the lower cap 110 of the body 104. The actuation system 500 of the illustrated example includes a conduit 512 (e.g., pipes) to house the connector 510 between the connector 506 and the reel 508. In this manner, the conduit 512 of the illustrated example prevents the connector 510 from damage and/or becoming entangled as the body 104 transforms between the first configuration 102 and the second configuration 202.

During operation, to move the body 104 from the second configuration 202 to the first configuration 102, the actuation system 500 of the illustrated example is activated via, for example, the controller 218 of the vehicle 100. For example, the motor 502 is activated to rotate the reel 508 in a first rotational direction 514 to cause the connector 510 to wind about the reel 508 (e.g., a surface or barrel of the reel). As the connector 510 winds about the reel 508, the connector 510 imparts a pulling force via the connector 506. Such a pulling force causes the upper cap 108 of the illustrated example to move toward the lower cap 110, thereby causing the body 104 to collapse from the second configuration 202 to the first configuration 102. To move the body 104 from the first configuration 102 to the second configuration 202, the motor 502 rotates the reel 508 in a second rotational direction 516 opposite the first rotational direction 514 to cause the connector 510 to unwind from the reel 508. As the connector 510 unwinds from the reel 508, a pulling force imparted to the connector 506 decreases. The movable joints (e.g., the movable joint 300 via the biasing element 304) causes the upper cap 108 to move in a direction away from the lower cap 110, thereby expanding the body 104 from the first configuration 102 to the second configuration 202.

Figure 6:
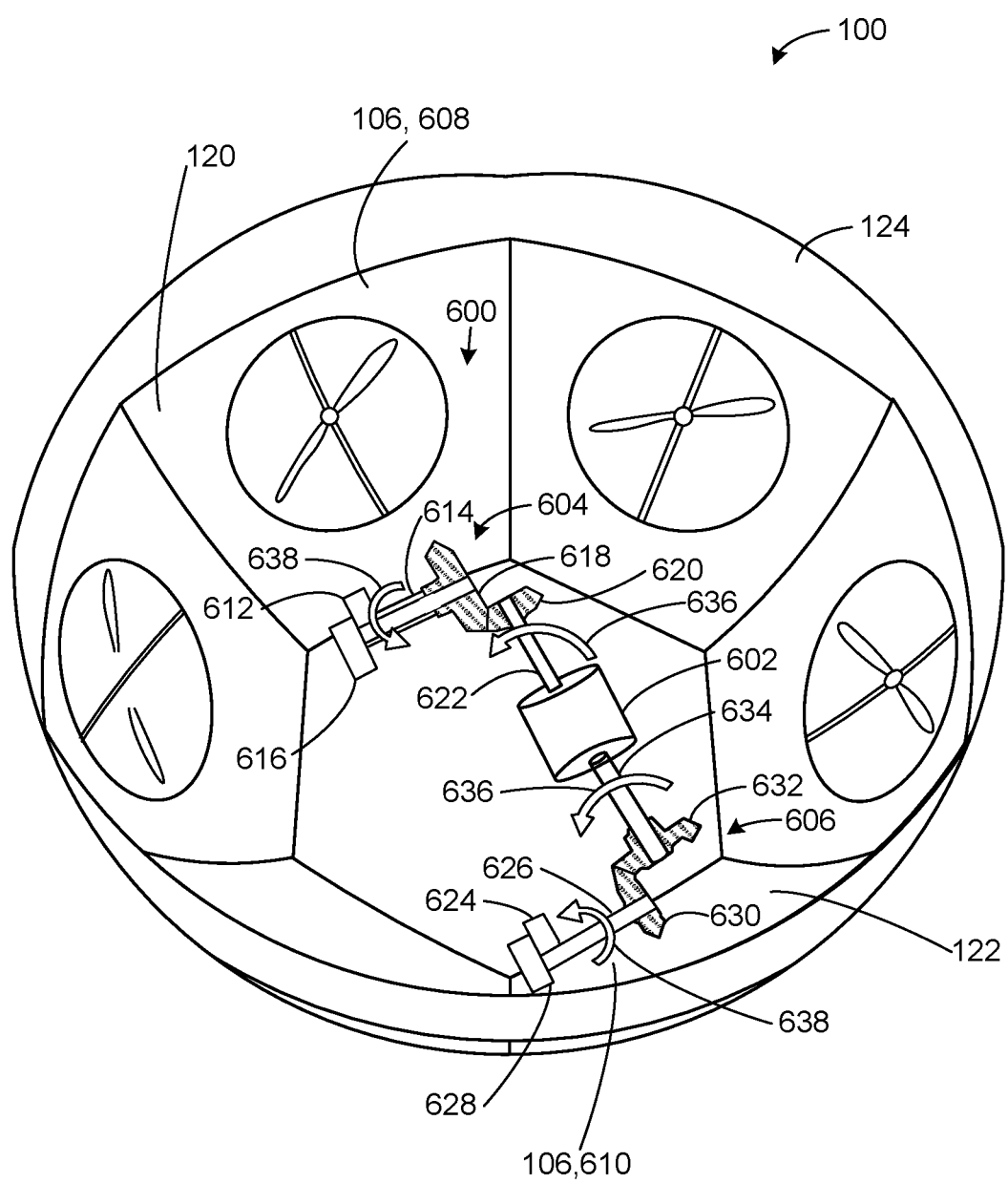
FIG. 6 is yet another example actuation system that may implement the example vehicle of FIGS. 1A, 1B, 2A and 2B.

FIG. 6 illustrates another example actuation system 600 that may be used to implement the example vehicle 100 disclosed herein. The actuation system 600 of the illustrated example includes a motor 602 that operates a first transmission 604 and a second transmission 606. The first transmission 604 is operatively coupled to the upper section 120 of a respective one 608 of the segments 106 and the second transmission 606 is operatively coupled to the lower section 122 of another respective one 610 of the segments 106 different than the respective one 608 of the segments 106. In some examples, the first transmission 604 is coupled to the upper section 120 of one of the segments 106 and the second transmission 606 is coupled to the lower section 122 of the one of the segments 106 associated with the upper section 120.

The first transmission 604 of the illustrated example includes a first coupler or connector 612 (e.g., a hasp, an anchor, fastener, etc.) coupled to the upper section 120 and a first shaft 614. The first shaft 614 of the illustrated example is journaled for rotation via a bearing 616 supported by the upper section 120. The first shaft 614 includes a first gear 618 (e.g., a bevel gear) that emmeshes with a first output gear 620 (e.g., a bevel gear) coupled to a first output shaft 622 of the motor 602.

Similarly, the second transmission 606 of the illustrated example includes a second coupler or connector 624 (e.g., a hasp, an anchor, fastener, etc.) coupled to the lower section 122 and a second shaft 626. The second shaft 626 of the illustrated example is journaled for rotation via a bearing 628 supported by the lower section 122. The second shaft 626 includes a second gear 630 (e.g., a bevel gear) that emmeshes with a second output gear 632 (e.g., a bevel gear) coupled to a second output shaft 634 of the motor 602.

To transform the body 104 of the vehicle 100 from the second configuration 202 to the first configuration 102, the motor 602 rotates the first output shaft 622 and the second output shaft 634 in a first rotational direction 636. Engagement between the first output gear 620 and the first gear 618 of the first shaft 614, and engagement between the second output gear 632 and the second gear 630 of the second shaft 626 causes the first and second shafts 614 and 626 to rotate in a first rotational direction 638. Rotation of the first and second shafts 614 and 626 in the first rotational direction 638 causes the first connector 612 and the second connector 624 to move toward each other. In turn, when the first connector 612 and the second connector 624 move toward each other, the first connector 612 imparts a first pulling force on the upper section 120 and the second connector 624 imparts a pulling force on the lower section 122. Such pulling forces are directed toward each other (e.g., toward a center or midpoint of the body 104) to cause the upper cap 108 to move toward the lower cap 110, and thereby causing the body 104 to move to the first configuration 102.

To transform the body 104 of the illustrated example from the first configuration 102 to the second configuration 202, the motor 602 rotates the first output shaft 622 and the second output shaft 634 in a second rotational direction opposite the first rotational direction 636. Engagement between the first output gear 620 of the first output shaft 622 and the first gear 618 of the first shaft 614, and engagement between the second output gear 632 of the second output shaft 634 and the second gear 630 of the second shaft 626, causes the first and second shafts 614 and 626 to rotate in a second rotational direction opposite the first rotational direction 638. As a result, the first connector 612 and the second connector 624 to move away from each other. In turn, when the first connector 612 and the second connector 624 move away from each other, the first connector 612 imparts a pushing force to the upper section 120 and the second connector 624 imparts a pushing force to the lower section 122. Such pushing forces are directed away from each other (e.g., in a direction away from a center or midpoint of the body 104) to cause the upper cap 108 to move away the lower cap 110, thereby causing the body 104 from the first configuration 102 to move to the second configuration 202. In some examples, the movable joint 300 (e.g., via the biasing element 304) assist the body 104 to expand to the second configuration 202. In some examples, the actuation system 400 of FIG. 4, the actuation system 500 of FIG. 5 and/or the actuation system 600 of FIG. 6 provide means for actuating to transform the body 104 between the first or disk configuration and the second or sphere configuration.

FIG. 7A is a perspective view of the example vehicle 100 shown in the first configuration 102. FIG. 7B is another perspective view of the example vehicle 100 shown in the second configuration 202. In the first configuration 102, the segments 106 of the illustrated example are radially spaced at a first angle (β) 704 relative to a longitudinal axis 114 (e.g., a center axis) of the vehicle 100. For example, the propellers 702 of the rotor assemblies 170 of the illustrated example are radially spaced at the first angle (β) 704 relative to the longitudinal axis of the body 104.

In the second configuration 202, an orientation of each propeller 702 of the rotor assemblies 170 is at a second angle (α) 706 relative to the longitudinal axis 114. In the illustrated example, the first angle (β) 704 (e.g., β is 60 degrees) is substantially similar (e.g., identical) relative to the second angle (α) 706 (e.g., α is 60 degrees).

To operate and/or maneuver the vehicle 100, the vehicle 100 of the illustrated example operates the propellers 702 at different rotational directions and/or different angular velocities to generate different thrust forces and/or reaction torques generated by of motors driving the propellers 702. For example, the propellers 702 of a first set 708 of the segments 106 rotate in a different direction relative to propellers 702 of a second set 710 of the segments 106. In the illustrated example, the first set 708 of segments 106 includes a first segment 708a, a second segment 708b and a third segment 708c. The second set 710 of the segments 106 of the illustrated example includes a fourth segment 710a, a fifth segment 710b and a sixth segment 710c. The first, second, and third segments 708a-c of the illustrated example are positioned in alternating configuration relative to the fourth, fifth and sixth segments 710a-c. For example, the first segment 708a of the illustrated example is positioned between the fourth segment 710a and the sixth segment 710c, and the fourth segment 710a is positioned between the first segment 708a and the second segment 708b. In other words, the first segment 708a is diametrically opposed to the fifth segment 710b, the second segment 708b is diametrically opposed to the sixth segment 710c, and the third segment 708c is diametrically opposed to the fourth segment 710a.

In the illustrated example, the propellers 702 of the first set 708 of the segments 106 rotate in a first rotational direction 712 (e.g., counterclockwise) and the propellers 702 of the second set 710 of segments 106 rotate in a second rotational direction 714 (e.g., clockwise) opposite the first rotational direction 712. For example, the first rotor 172 of the upper section 120 of the first set 708 of the segments 106 (e.g., the first, second and third segments 708a-c) and the second rotor 174 of the lower section 122 of the first set 708 of the segments 106 (e.g., the first, second and third segments 708a-c) rotate in the first rotational directional 712. For example, the first rotor 172 of the upper section 120 of the second set 710 of the segments 106 (e.g., the fourth, fifth and sixth segments 710a-c) and the second rotor 174 of the lower section 122 of the second set 710 of the segments 106 (e.g., the fourth, fifth and sixth segments 710a-c) rotate in the second rotational direction 714. Thus, a respective one of the propellers 702 of the upper section 120 is mirrored in both direction and propeller design relative to a respective one of the propellers 702 of the lower section 122.

During operation of the vehicle 100 when the body 104 is in the first configuration 102, the vehicle 100 of the illustrated example employs conventional hexa-copter controls or algorithms to maneuver or control the vehicle 100.

The vehicle 100 of the illustrated example employs a first control law to guide (e.g., maneuver) the vehicle 100 in a three-dimensional translation (e.g., x-direction, y-direction and z-direction) and employs a second control law to guide (e.g., maneuver) the vehicle 100 in a two-dimensional translation (e.g., x-direction and y-direction). To maneuver the vehicle 100 in the first mode of operation or the second mode of operation when the body 104 is in the second configuration 202, the controller 218 (FIG. 2B) of the illustrated example adjusts angular velocities of motors driving the propellers 702 based on mapped forces and rotational speeds of each of the motors required to move the vehicle 100 along the estimated trajectory path. The angular velocity of each of the motors is adjusted so that a total force (e.g., thrust output) of the propellers 702 is applied in a desired direction. Examples methods for determining a desired force vector (e.g., total force vector) by adjusting the angular velocities of each of the motors driving the propellers 702 is described in FIGS. 8A and 8B.

Figure 8A:
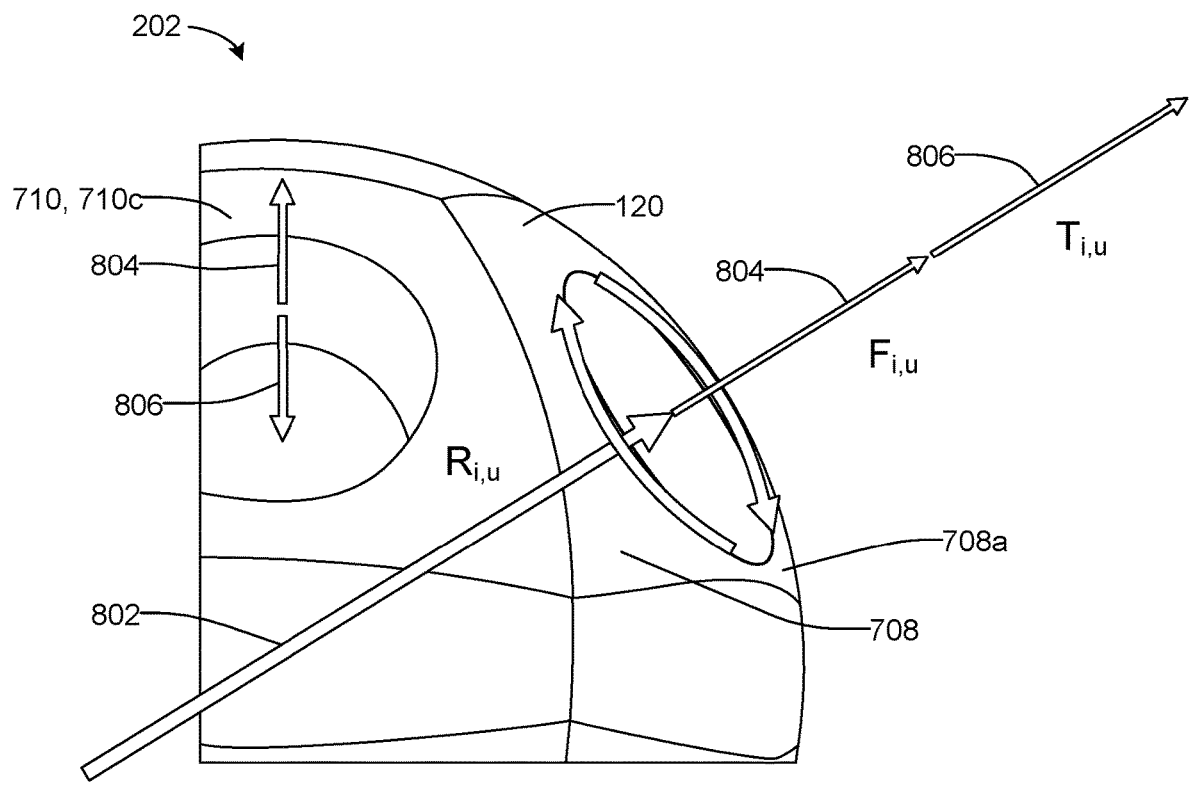
FIG. 8A is a partial view of an example upper section of the example vehicle of FIG. 7B.
Figure 8B:
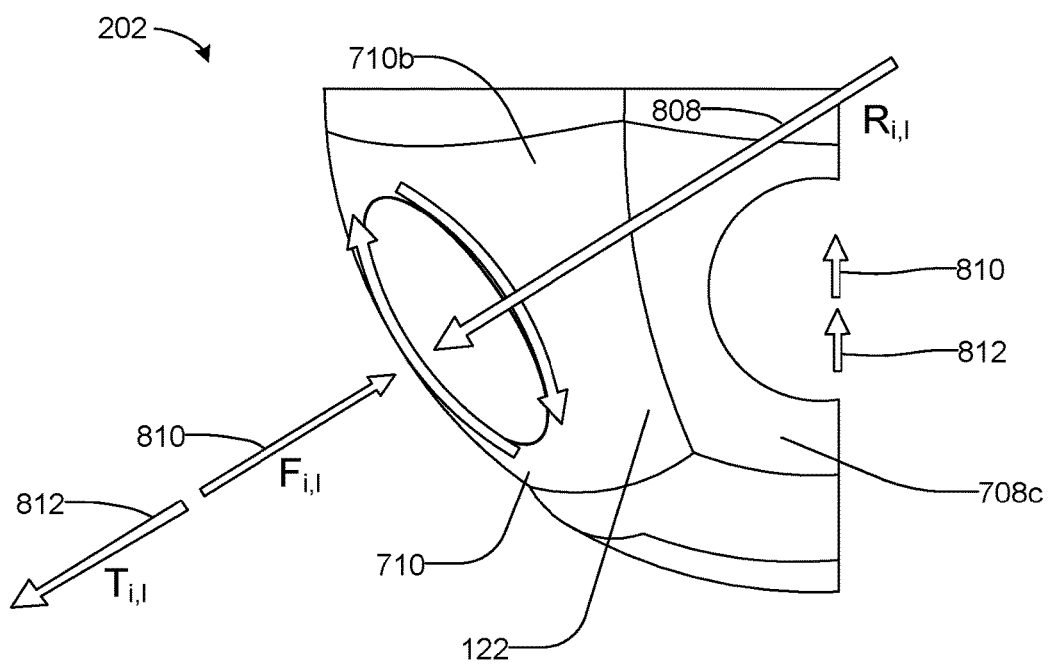
FIG. 8B is a partial view of an example lower section of the example vehicle of FIG. 7B.

FIG. 8A is a partial view of a respective one of the upper section 120 of the segments 106 of the example vehicle 100 of FIG. 7B. FIG. 8B is a partial view of a respective one of the lower section 122 of the segments 106 of the example vehicle 100 of FIG. 7B. In particular, FIG. 8A illustrates the propeller 702 of an upper section 120 of the first segment 708a and FIG. 8B illustrates the lower section 122 of the fifth segment 710b.

FIG. 8A illustrates a position vector ($R_{i,u}$) 802, an individual force vector ($F_{i,u}$) 804 and an individual reaction torque vector ($T_{i,u}$) 806 associated with the propeller 702 of the upper section 120 of the first segment 708a. FIG. 8B illustrates a position vector ($R_{i,l}$) 808, an individual force vector ($F_{i,l}$) 810, and an individual reaction torque vector ($T_{i,l}$) 812 associated with the propeller 702 of the lower section 122 of the fifth segment 710b. The description of FIGS. 8A and 8B applies to all pairs of propellers 702 (e.g., a respective one of the propellers 702 of the upper section 120 that is aligned with a respective one of the propellers 702 of the lower section 122).

Given that an axis of rotation of each of the propellers 702 is aligned (e.g., parallel) with a radius (e.g., the position vector ($R_{i,u}$) 802 and the position vector ($R_{i,u}$) 808) to a center point of the body 104, the propellers 702 do not produce a torque (e.g., an angular momentum) that would otherwise be produced if the axis of rotation of the propellers 702 was perpendicular to the center of the body 104. However, each of the motors driving the propellers 702 generate an individual reaction torque vector ($T_i$) (e.g., the individual reaction torque vector ($T_{i,l}$) 806 and the individual reaction torque vector ($T_{i,u}$) 804).

Referring to FIGS. 8A and 8B, during operation of the vehicle 100 in the second configuration 202, the individual force vector ($F_{1,u}$) 804 (e.g. a thrust force) exerted by a respective one of the propellers 702 in the upper section 120 (e.g., the propeller 702 of the first segment 708a) is directed in the same direction as the individual force vector ($F_{i,l}$) 810 (e.g., a thrust vector) exerted by a respective one of the propellers 702 in the lower section 122 (e.g., the propeller 702 of the fifth segment 710b) that is aligned (e.g., axially aligned) with the respective one of the propellers 702. The directional orientation of the individual force vectors ($F_{1,u}$) 804 and ($F_{i,l}$) 810 are provided in the same direction via an airfoil (e.g., a shape) of the propellers 702. Thus, irrespective of a rotational direction of the propellers 702 (e.g., the first rotational direction 712 or the second rotational direction 714), the propellers 702 generate the individual force vector ($F_{i,u}$) 804 and the individual force vector ($F_{i,l}$) 810 in the same direction (e.g., in an aligned direction or parallel direction). In the illustrated example, each of the propellers 702 of the illustrated example generate an individual force vector (e.g., the force vectors ($F_{i,u}$) 804 and ($F_{i,l}$) 810) in an upwardly direction in the orientation of FIGS. 8A and 8B.

The rotational direction of the propellers 702 of the first set 708 of segments 106 and the second set 710 of segments 106 affect a directional orientation of the individual reaction torque vectors ($T_{i,u}$) 806 and ($T_{i,l}$) 812. For example, for the first set 708 of segments 106, a direction of the individual reaction torque vector ($T_{i,u}$) 806 is in the same direction relative to the individual force vector ($F_{i,u}$) 804, and a direction of the individual reaction torque vector ($T_{i,l}$) 812 is in the opposite direction relative to the individual force vector ($F_{i,l}$) 810. Conversely, for the second set 710 of segments 106, a direction of the individual reaction torque vector ($T_{i,u}$) 806 is opposite relative to a direction the individual force vector ($F_{i,u}$) 804 and a direction of the individual reaction torque vector ($T_{i,l}$) 812 is in the same direction as the individual force vector ($F_{i,l}$) 810.

As shown in FIG. 8A, a direction of the individual reaction torque vector ($T_{i,u}$) 806 is the same as a direction of the individual force vector ($F_{i,u}$) 804. As shown in FIG. 8B, a direction of the individual reaction torque vector ($T_{i,l}$) 812 is opposite relative to a direction of the individual force vector ($F_{i,l}$) 810. Thus, for each pair of propellers 702 (e.g., a respective one of the propellers 702 of the upper section 120 that is aligned with a respective one of the propellers 702 of the lower section 122), the individual force vector ($F_{i,u}$) 804 of the upper section 120 is in the same direction as the individual force vector ($F_{i,l}$) 810 of the lower section 122. Additionally, the individual reaction torque vector ($T_{i,u}$) 806 of the upper section 120 is in an opposite direction relative to the individual reaction torque vector ($T_{i,l}$) 812 of the lower section 122.

Thus, a pair provided by a respective one of the propellers 702 of the first rotor 172 of the upper section 120 that is aligned or associated with (e.g., directly opposite to) a respective one of the propellers 702 of the second rotor 174 of the lower section 122 represents a summation force $F_i$ (e.g. a thrust force) and a summation torque ($T_i$). The vehicle 100 of the illustrated example includes six pairs rotors. Thus, the propellers 702 of the illustrated example provide six pairs of summation force vectors ($F_1$, $F_2$, $F_3$, $F_4$, $F_5$, $F_6$) and six pairs of summation torque vectors ($T_1$, $T_2$, $T_3$, $T_4$, $T_5$, $T_6$) (i.e., i=6). For example, the first summation force ($F_1$) of the illustrated example is provided by the summation of an individual force vector ($F_{1,u}$) of the propeller 702 of the upper section 120 of the first segment 708a and an individual force vector ($F_{1,l}$) of the propeller 702 of the lower section 122 of the fifth segment 710b. The first summation torque ($T_1$) is provided by a difference between an individual reaction torque vector ($T_{1,u}$) of the propeller 702 of the upper section 120 of the first segment 708a and an individual reaction torque vector ($T_{1,l}$) of the propeller 702 of the lower section 122 of the fifth segment 710b.

For example, a second summation force ($F_2$) of the illustrated example is provided by the summation of an individual force vector ($F_{2,u}$) of the propeller 702 of the upper section 120 of the fifth segment 710b and an individual force vector ($F_{2,l}$) of the propeller 702 of the lower section 122 of the first segment 708a. A second summation torque $T_2$ of the illustrated example is provided by a difference between an individual reaction torque vector ($T_{2,u}$) of the propeller 702 of the upper section 120 of the fifth segment 710b and an individual torque vector ($T_{2,l}$) of the propeller 702 of the lower section 122 of the first segment 708a.

For example, a third summation force $F_3$ of the illustrated example is provided by the summation of an individual force vector ($F_{3,u}$) of the propeller 702 of the upper section 120 of the second segment 708b and an individual force vector ($F_{3,l}$) of the propeller 702 of the lower section 122 of the sixth segment 710c. A third summation torque ($T_3$) of the illustrated example is provided by a difference between an individual reaction torque vector ($T_{3,u}$) of the propeller 702 of the upper section 120 of the second segment 708b and an individual reaction torque vector ($T_{3,l}$) of the propeller 702 of the lower section 122 of the sixth segment 710c.

For example, a fourth summation force $F_4$ of the illustrated example is provided by the summation of an individual force vector ($F_{4,u}$) of the propeller 702 of the upper section 120 of the sixth segment 710c and an individual force vector ($F_{4,l}$) of the propeller 702 of the lower section 122 of the second segment 708b. A fourth summation torque ($T_4$) of the illustrated example is provided by a difference between an individual reaction torque vector ($T_{4,u}$) of the propeller 702 of the upper section 120 of the sixth segment 710*c* and an individual reaction torque vector ($T_{4,l}$) of the propeller 702 of the lower section 122 of the second segment 708*b*.

For example, a fifth summation force ($F_5$) of the illustrated example is provided by the summation of an individual force vector ($F_{5,u}$) of the propeller 702 of the upper section 120 of the third segment 708*c* and an individual force vector ($F_{5,l}$) of the propeller 702 of the lower section 122 of the fourth segment 710*a*. A fifth summation torque ($T_5$) of the illustrated example is provided by a difference between an individual reaction torque vector ($T_{5,u}$) of the propeller 702 of the upper section 120 of the third segment 708*c* and an individual reaction torque vector ($T_{5,l}$) of the propeller 702 of the lower section 122 of the fourth segment 710*a*.

For example, a sixth summation force $F_6$ of the illustrated example is provided by the summation of an individual force vector ($F_{6,u}$) of the propeller 702 of the upper section 120 of the fourth segment 710*a* and an individual force vector ($F_{6,l}$) of the propeller 702 of the lower section 122 of the third segment 708*c*. A sixth summation torque ($T_6$) of the illustrated example is provided by a difference between an individual reaction torque vector ($T_{6,u}$) of the propeller 702 of the upper section 120 of the fourth segment 710*a* and an individual reaction torque vector ($T_{6,l}$) of the propeller 702 of the lower section 122 of the third segment 708*c*.

The magnitude of the individual force vector ($F_{i,u}$) 804 and the magnitude of the individual reaction torque vector ($T_{i,u}$) 806 of the illustrated example is provided by an angular velocity of a motor of a respective one of the propellers 702 of the upper section 120, and the magnitude of the individual force vector ($F_{i,l}$) 804 and the magnitude of the individual reaction torque vector ($T_{i,l}$) 806 of the illustrated example is provided by an angular velocity of a motor of a respective one of the propellers 702 of the lower section 122. Thus, a magnitude of the summation force $F_i$ of the individual force vector ($F_{i,u}$) 804 and the magnitude of the individual force vector ($F_{i,l}$) 810 can be determined by the following equation:

$$|F_i| = |F_{i,u}| + |F_{i,l}|$$ EQ1:

The magnitude of the individual force ($F_{i,u}$) 804 is represented by the following equation:

$$F_{i,u} = C_T \omega_{i,u}^2;$$ EQ2:

where $C_T$ is a thrust coefficient of a propeller $(i, u)$ and $\omega_{i,u}^2$ is the square of the angular velocity of a motor associated with the propeller $(i,u)$.

The magnitude of the individual force vector ($F_{i,u}$) 810 is represented by the following equation:

$$|F_{i,l}| = C_T \omega_{i,l}^2;$$ EQ3:

where $C_T$ is a thrust coefficient of a propeller $(i,l)$ and $\omega_{i,l}^2$ is the square of the angular velocity of a motor associated with the propeller $(i,l)$.

Thus, the magnitude of the summation force ($F_i$) can be represented by the following equation:

$$|F_i| = C_T \omega_{i,u}^2 + C_T \omega_{i,l}^2$$ EQ4:

The magnitude of the summation torque ($T_i$) of the magnitude of the individual total reaction torque vector ($T_{i,u}$) 806 and the magnitude of the individual reaction torque vector ($T_{i,l}$) 812 can be determined by the following equation:

$$|T_i| = |T_{i,u}| - |T_{i,l}|$$ EQ5:

The magnitude of the individual reaction torque vector ($T_{i,u}$) 806 is represented by the following equation:

$$|T_{i,u}| = C_Q \omega_{i,u}^2$$ EQ6:

where $C_Q$ is a drag coefficient of a propeller $(i,u)$ and $\omega_{i,u}^2$ is the square of the angular velocity of a motor associated with the propeller $(i,u)$.

The magnitude of the individual reaction torque vector ($T_{i,l}$) 812 is represented by the following equation:

$$|T_{i,l}| = C_Q \omega_{i,l}^2$$ EQ7:

where $C_Q$ is a drag coefficient of a propeller $(i,l)$ and $\omega_{i,u}^2$ the square of the angular velocity of a motor associated with the propeller $(i,u)$.

Thus, the magnitude of the summation torque ($T_{i,u}$) can be determined by the following equation:

$$|T_{i,l}| = C_Q \omega_{i,u}^2 - C_Q \omega_{i,l}^2$$ EQ8:

Based on the relationship between the summation force ($F_i$) and the summation torque ($T_i$), the angular velocity of a motor associated with the upper section 120 can be calculated by the following equation:

$$\omega_{i,u}^2 = \frac{C_Q|F_i| + C_T|T_i|}{2C_Q C_T}$$ EQ9

Similarly, the angular velocity of a motor associated with the lower section 122 can be calculated by the following equation:

$$\omega_{i,l}^2 = \frac{C_Q|F_i| - C_T|T_i|}{2C_Q C_T}$$ EQ10

To determine the summation force $F_i$ and the summation reaction torque ($T_i$) for each pair of propellers 702 (and, thus, the angular velocity for each motor of the propellers 702), an estimated total force ($F_T$) and an estimated total torque ($T_T$) is determined based on a model of an estimated trajectory path determined or estimated by the controller 218.

A model of a translational trajectory path of the vehicle 100 in the second configuration 202 can be established with the following equation:

$$ma = F_{T_W} + mg\hat{z}$$ EQ11:

Where (ma) represents the product of the mass of the body 104 and the acceleration of the body 104; the estimated total force ($F_{T_W}$) is a total force generated by the body 104 relative to an external reference frame (e.g., a world reference) of the body 104; and (mgẑ) is the product of mass of the body 104, gravity (e.g., 9.8 m/s2) and a magnitude of a vector in the z-direction (e.g., a vertical direction) of an x-y-z coordinate system.

To operate the vehicle 100 in the first mode of operation (e.g., aerial mode) when the body 104 is in the second configuration 202, the estimated total force ($F_{T_W}$) must be greater than the product of the mass of the vehicle 100 ($m$) and gravity (e.g., 9.81 m/s²). When the body 104 is in the second configuration 202 and operating in the second mode of operation, the estimated total force ($F_{T_W}$) is less than the product of the mass of the vehicle 100 and gravity. In other words, when the vehicle 100 is in the second mode of operation, the magnitude of the z-vector is zero, and thus, equation 11 can be simplified to $ma = F_{T_W}$.

A model of rotational trajectory path of the vehicle 100 in the second configuration 202 can be established with the following equation:

$$I\dot{\omega} = \omega \times I\omega + T_T \qquad \text{EQ12}$$

Where ($I\dot{\omega}$) is the product of inertial momentum and angular acceleration of the body 104; ($\omega$) represents the angular velocity vector of the body 104; ($I\omega$) represents the product of the internial momentum and the angular velocity of the body 104; and ($T_T$) is the estimated total torque of the body 104. The control inputs provided by the estimated total torque ($T_T$) and the estimated total force ($F_{T_W}$) can be designed to control the linear and rotational motion using a conventional model based controller or the controller 218 of FIG. 2B.

Thus, equations 11 and 12 can be used to obtain the estimated total force ($F_{T_W}$) and the estimated total torque ($T_T$), respectively.

The estimated total force ($F_{T_W}$) of equation 11 is provided from an external reference frame (e.g., a world reference, a global rotational coordinate system). However, a total force ($F_T$) from a local reference frame of the body 104 can be provided using a relationship between the estimated total force ($F_{T_W}$) and the rotational or navigation angles yaw ($\psi$), roll ($\phi$) and pitch ($\theta$):

$$F_{T_W} = R(\psi, \phi, \theta) F_T \qquad \text{EQ13}$$

Thus, the total force ($F_T$) provided from a reference frame of the body 104 of the vehicle 100 is determined using equation 13.

Given a desired trajectory in the 3D space x(t), y(t) and z(t), the forces required to track such trajectories can be obtained by the following equation:

$$F_T = mR(\psi, \phi, \theta)^{-1} \begin{bmatrix} u_x \\ u_y \\ u_z - g \end{bmatrix} \qquad \text{EQ14}$$

where $u_x$, $u_y$ and $u_z$ can be computed as a function of the error in position and velocity in the respective axis using control methods such as, for example, proportional-integral-derivative control (PID), linear quadratic regulator control (LQR), sliding mode control, continuous super twisting algorithm, continuous twisting algorithm, etc.

After the total force ($F_T$) with reference to the body 104 is determined, the summation forces ($F_i$) associated with the pair of propellers ($F_i$) (e.g., $F_1 \ldots F_6$) can be determined with the following equation:

$$F_T = [F_x F_y F_z]^T \qquad \text{EQ15}$$

The following matrix relates to the summation forces ($F_i$) (e.g., $F_1 \ldots F_6$) and the total force ($F_T$).

$$F_T = \begin{bmatrix} F_x \\ F_y \\ F_z \end{bmatrix} = [H] \begin{bmatrix} F_1 \\ \vdots \\ F_6 \end{bmatrix}; \qquad \text{EQ16}$$

where H is a matrix:

$$H = \begin{bmatrix} \sin(\alpha)\cos(\beta) & \ldots & \sin(\alpha)\cos(6\beta) \\ \sin(\alpha)\sin(\beta) & \ldots & \sin(\alpha)\sin(6\beta) \\ \cos(\alpha) & \ldots & \cos(\alpha) \end{bmatrix}; \qquad \text{EQ17}$$

Thus, equation 16, when combined with equation 17, becomes:

$$F_T = \begin{bmatrix} F_x \\ F_y \\ F_z \end{bmatrix} = \begin{bmatrix} \sin(\alpha)\cos(\beta) & \ldots & \sin(\alpha)\cos(6\beta) \\ \sin(\alpha)\sin(\beta) & \ldots & \sin(\alpha)\sin(6\beta) \\ \cos(\alpha) & \ldots & \cos(\alpha) \end{bmatrix} \begin{bmatrix} F_1 \\ \vdots \\ F_6 \end{bmatrix} \qquad \text{EQ18}$$

where the angle ($\alpha$) of the illustrated example is provided by the angle 706 of FIG. 7B and the angle ($\beta$) of the illustrated example is provided by the angle 704 of FIG. 7A. The matrix H relates to the individual force vectors ($F_{i,u}$) 804 and ($F_{i,l}$) 810 and has a rank 3, which means that every force vector ($F_{i,u}$) 804 and ($F_{i,l}$) 810 associated with the propellers 702 of the upper section 120 and the lower section 122 can be obtained.

The magnitude of the total torque ($T_T$) from equation 12 is provided from the local reference of the body 104 (e.g., a local rotational coordinate system) and, thus, does not need to be converted using the navigational angles. After the total force ($T_T$) is determined, a magnitude of the summation reaction torque values ($T_i$) associated with the pair of propellers 702 (e.g., $T_1 \ldots T_6$) can be determined with the following equation:

$$T_T = [T_x T_y T_z]^T \qquad \text{EQ19:}$$

As noted above in connection with Equation 14, tracking an orientation trajectory can be performed or computed as a function of the error in the angle and the angular velocity in the respective axis using control methods, such as proportional-integral-derivative control (PID), linear quadratic regulator control (LQR), sliding mode control, continuous super twisting algorithm(s), continuous twisting algorithm, etc.

The following matrix relates to the summation reaction torque vector ($T_i$) (e.g., $T_1 \ldots T_6$) and the total torque ($T_T$).

$$T_T = \begin{bmatrix} T_x \\ T_y \\ T_z \end{bmatrix} = \begin{bmatrix} \sin(\alpha)\cos(\beta) & \ldots & \sin(\alpha)\cos(6\beta) \\ \sin(\alpha)\sin(\beta) & \ldots & \sin(\alpha)\sin(6\beta) \\ \cos(\alpha) & \ldots & \cos(\alpha) \end{bmatrix} \begin{bmatrix} T_1 \\ \vdots \\ T_6 \end{bmatrix} \qquad \text{EQ20}$$

After the summation forces ($F_i$) and the summation reaction torques ($T_i$) are determined, an angular velocity for a respective one of the motors driving a respective one of the propellers 702 in the upper section 120 and an angular velocity for a respective one of the motors driving a respective one of the propellers 702 in the lower section 122 can be determined or calculated to move the vehicle 100 along a projected or estimated trajectory path.

Figure 9:
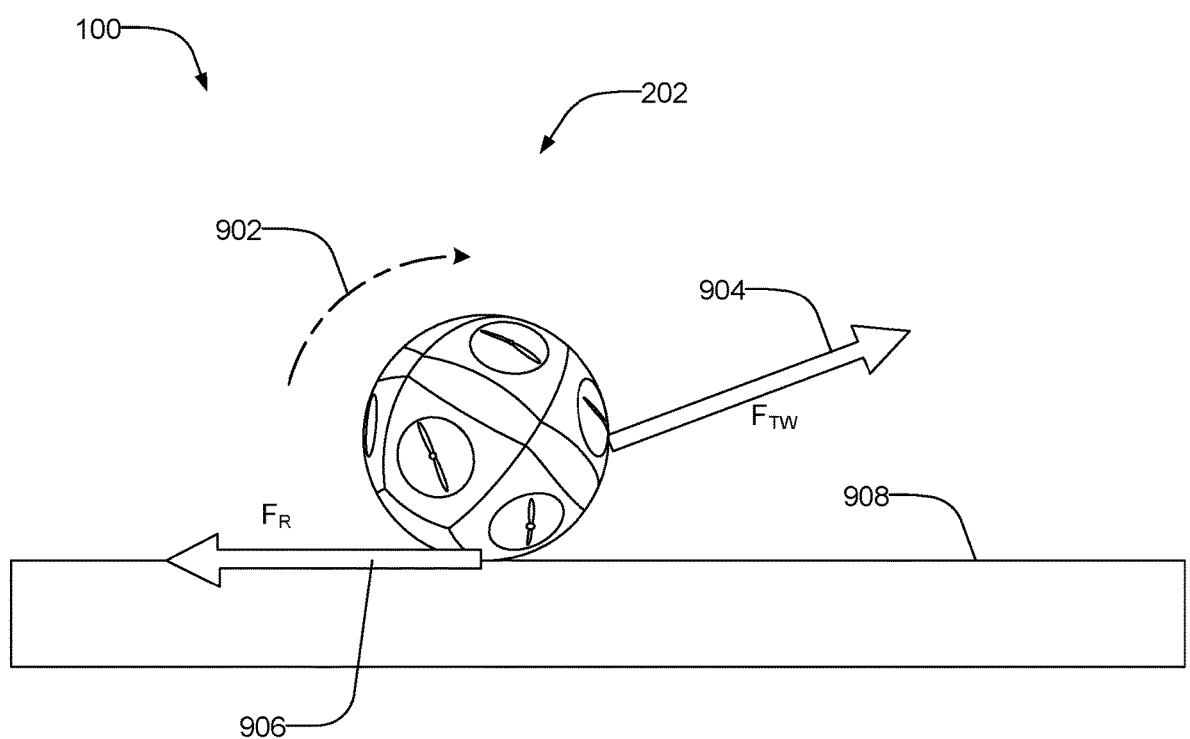
FIG. 9 is another partial view of the example vehicle of FIG. 7B shown in the example second configuration and in the example second mode of operation.

FIG. 9 illustrates the vehicle 100 in the second configuration 202 and in the second mode of operation (e.g., land mode). A torque 902 on the body 104 generated a total force ($F_{T_W}$) 904 and a friction force ($F_r$) 906 causes the body 104 to roll on the ground 908. Therefore, in the second mode of operation, the translational motion on the x-direction and the y-direction plane can be controlled by choosing the direction of the total force vector ($F_{T_W}$) 904 without consideration of the total reaction torque ($T_T$) (e.g., if a z-directional component is less than the product of the mass (m) of the vehicle 100 and gravity (g)).

Figure 10:
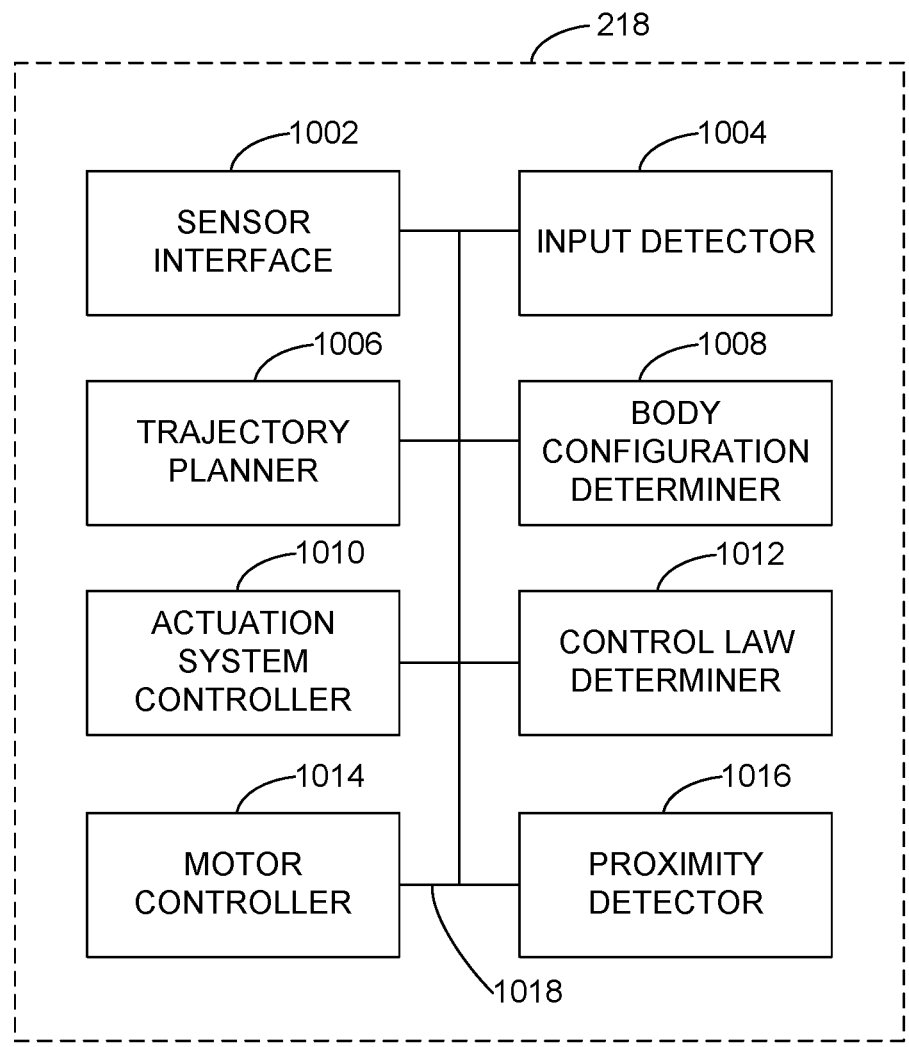
FIG. 10 is a block diagram of an example processor constructed in accordance with the teachings of this disclosure that may implement example vehicle disclosed herein.

FIG. 10 is a block diagram of an example processor constructed in accordance with the teachings of this disclosure that may implement the example controller 218 of the example vehicles disclosed herein. The controller 218 of the illustrated example includes an example sensor interface 1002, an example input detector 1004, an example trajectory planner 1006, an example body configuration determiner 1008, an example actuation system controller 1010, an example control law determiner 1012, an example motor controller 1014, and an example proximity detector 1016 that are communicatively coupled via an example communication bus 1018.

The sensor interface 1002 of the illustrated example facilitates control and data acquisition of one or more sensors of the vehicle 100. As described above, example sensors may include, but are not limited to, the orientation sensor(s) 220, the position sensors(s) 222, the proximity sensor(s) 224, the switch sensor(s) 226, the camera 194, an accelerometer(s), a GSP sensor, an altimeter, a gyroscope, etc. The example sensor interface 1002 obtains information from via the feedback signal(s) of the sensors, which can represent a binary value (e.g., on/off), a digital value, an analog value, an image and/or a video. In some examples, the sensor interface 1002 retrieves, receives and/or otherwise obtain information from the feedback signal(s) as a voltage signal (e.g., a direct current voltage value) that, when compared to a sensor device look-up table (reference) reveals a corresponding physical state (e.g., a distance in centimeters, etc.).

The input detector 1004 of the illustrated example receives a command. A command can include, for example, a command to activate/operate the payload 190 (e.g., the camera), a command to travel to a desired destination, and/or any other command(s). For example, the input detector 1004 may receive a command to move the vehicle 100 between a preprogrammed or predetermined distance between a first location and a second location. In some examples, the command input receives commands from, for example, a user interface, a remote-control module, an external or central command center, etc. For example, the input detector 1004 may receive commands via a remote control communicatively coupled to the vehicle 100.

The trajectory planner 1006 of the illustrated example determines or estimates a trajectory path of the vehicle 100 based on the received command input(s) provided by the input detector 1004. The trajectory planner 1006 of the illustrated example may estimate or establish a trajectory path or distance of the vehicle 100 to travel between a first location (e.g., a current position of the vehicle 100 provided by a position sensor, a location A, etc.) of the vehicle 100 and a second location (e.g., a destination, a location B, etc.) received by the input detector 1004. In some examples, the trajectory planner 1006 of the illustrated example determines if the overall path is to be completed in the first mode of operation, the second mode of operation, and/or a combination of the first mode of operation and the second mode of operation. Additionally, in some examples, the trajectory planner 1006 may determine if the trajectory path is to be completed in the first configuration 102 or the second configuration 202. In some examples, the trajectory planner 1006 of the illustrated example may map a trajectory path of the vehicle 100 based on a received starting destination point and a destination point received the input detector 1004. In some examples, the trajectory planner 1006 of the illustrated example may map a trajectory path of the vehicle 100 based on a received input commands provided by a user via a remote-control apparatus communicatively (e.g., wirelessly) coupled to the vehicle 100. Thus, the trajectory planner 1006 of the illustrated example may map the trajectory path as the command input receives command signals from a user via a remote control. Thus, the trajectory path may be estimated prior to take-off of the vehicle 100 and/or may be estimated or created during operation of the vehicle 100 based on received inputs. In some examples, the trajectory planner 1006 plans a landing trajectory when the input detector 1004 receives a landing signal. The trajectory planner 1006 maps or plans a landing trajectory.

The body configuration determiner 1008 of the illustrated example determines if the body 104 is in the first configuration 102 or the second configuration 202. For example, the body configuration determiner 1008 may receive a signal provided to the sensor interface 1002 by a limit switch sensor. The limit switch may be provided on the upper cap 108, the lower cap 110 and/or the upper section 120, the lower section 122 and/or the intermediate section 124 of the segments 106. For example, to land the vehicle 100, the body configuration determiner 1008 determines if the body 104 is in the first configuration 102 or the second configuration 202. If the body is in the first configuration 102 when the input detector 1004 receives a landing signal, the body configuration determiner 1008 causes the actuation system controller 1010 to transform the body 104 to the second configuration 202. The body 104 of the illustrated example lands when the body 104 is in the second configuration 202. In some examples, when the input detector 1004 receives a signal to activate the payload 190 (e.g., the camera 194), the body configuration determiner 1008 determines if the body is in the first configuration 102 and/or causes the body 104 to transform to the first configuration 102 if the body configuration determiner 1008 determines that the body 104 is in the second configuration 202 when the input detector 1004 receives a signal to activate the payload 190.

The actuation system controller 1010 of the illustrated example may receive a command from the body configuration determiner 1008 to transform the body 104 between the first configuration 102 and the second configuration 202. For example, the actuation system controller 1010 of the illustrated example activates the example actuation system 400 of FIG. 4, the example actuation system 500 of FIG. 5 and/or the actuation system 600 of FIG. 6. For example, the actuation system controller 1010 applies a current or voltage to the shape memory alloy of the actuation system 400 of FIG. 4 to convert the body 104 from the first configuration 102 to the second configuration 202, and the actuation system controller 1010 removes a current or voltage to the shape memory alloy of the actuation system 400 of FIG. 4 to convert the body 104 from the second configuration 202 to the first configuration 102. The actuation system controller 1010 of the illustrated example may control the motors of the respective actuation system 500 and 600 to transform the body 104 between the first configuration 102 and the second configuration 202.

To operate the vehicle 100 along the trajectory path established by the trajectory planner 1006, the control law determiner 1012 may select between different control laws (e.g., algorithms). The control laws employed by the control law determiner 1012 may be used to determiner an angular velocity for each motor of the propellers. Operating each motor of the propellers at a calculated angular velocity causes the vehicle 100 to travel along the trajectory path provided by the trajectory planner 1006.

For example, when the vehicle 100 is in the first configuration 102 and operates in the first mode of operation (e.g., aerial mode), the control law determiner 1012 selects a first control law (e.g., conventional hexa-copter control laws). The control law determiner 1012 selects a second control law when the vehicle 100 is in the second configuration 202 and operating in the first mode of operation (e.g., aerial mode). For example, the control law determiner 1012 of the illustrated example obtains an angular velocity value of a respective one of the motors driving a respective one of the propellers based on a total translational force value ($F_{T_W}$) and a total torque value ($T_T$). The control law determiner 1012 selects a third control law when the vehicle 100 is in the second configuration 202 and operating in the second mode of operation (e.g., ground mode). For example, the control law determiner 1012 of the illustrated example obtains an angular velocity value of a respective one of the motors driving a respective one of the propellers based on a total translational force value ($F_{T_W}$). The first, second, and third control laws are different from each other. After selecting the desired control law based on the configuration and/or the mode of operation of the vehicle 100, the control law determiner 1012 calculates an angular velocity value for each motor of the vehicle 100. For example, the control law determiner 1012 employs one or more formulas noted above in connection with FIGS. 7A, 7B, 8A, 8B and 9 to determine an angular velocity value for each motor. In some examples, the control law determiner 1012 receives signals from one or more position sensors (e.g., accelerometers, etc.) to determine the angular velocity value for each motor.

The motor controller 1014 of the illustrated example operates the motors of the propellers based on the angular velocity values determined by the control law determiner 1012. For example, the motor controller 1014 of the illustrated example operates each motor independently. For example, the motor controller 1014 of the illustrated example operates each motor based on the angular velocity value determined by the control law determiner 1012 for each of the motors.

The proximity detector 1016 of the illustrated example determines a proximity of the body 104 relative to an external object. For example, the proximity detector 1016 of the illustrated example receives one or move signals from the sensor interface 1002 provided by the proximity sensor of the vehicle 100. The proximity detector 1016 may employ a comparator to compare the received signals from the proximity sensor to a proximity threshold. If the received signals are less than a proximity threshold, the proximity detector 1016 commands the actuation system controller 1010 to transform the body 104 to the second configuration 202 if the body configuration determiner 1008 determines that the body 104 is in the first configuration 102.

While an example manner of implementing the controller 218 of FIG. 2 is illustrated in FIG. 10, one or more of the elements, processes and/or devices illustrated in FIG. 10 may be combined, divided, re-arranged, omitted, eliminated and/or implemented in any other way. Further, the example sensor interface 1002, the example input detector 1004, the example trajectory planner 1006, the example body configuration determiner 1008, the example actuation system controller 1010, the example control law determiner 1012, the example motor controller 1014, and the example proximity detector 1016, and the example controller 218 of FIG. 3 may be implemented by hardware, software, firmware and/or any combination of hardware, software and/or firmware. Thus, for example, any of the example sensor interface 1002, the example input detector 1004, the example trajectory planner 1006, the example body configuration determiner 1008, the example actuation system controller 1010, the example control law determiner 1012, the example motor controller 1014, and the example proximity detector 1016 and/or, more generally, the example controller 218 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 1002, the example input detector 1004, the example trajectory planner 1006, the example body configuration determiner 1008, the example actuation system controller 1010, the example control law determiner 1012, the example motor controller 1014, and the example proximity detector 1016 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 218 of FIG. 3 may include one or more elements, processes and/or devices in addition to, or instead of, those illustrated in FIG. 10, and/or may include more than one of any or all of the illustrated elements, processes and devices.

Figure 11:
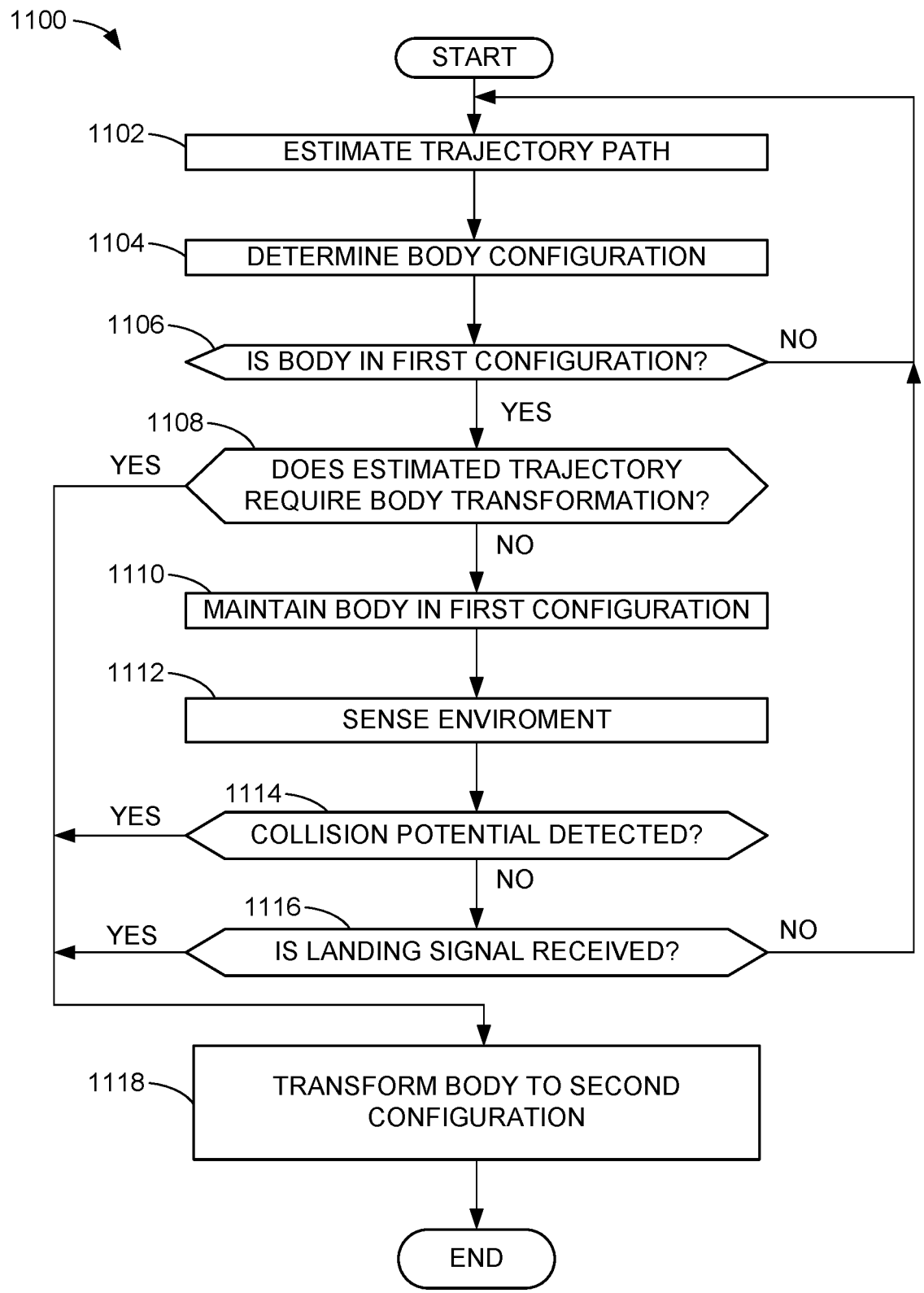
FIGS. 11-13 are flowcharts representative of example machine readable instructions that may be executed to implement example vehicle disclosed herein.
Figure 12:
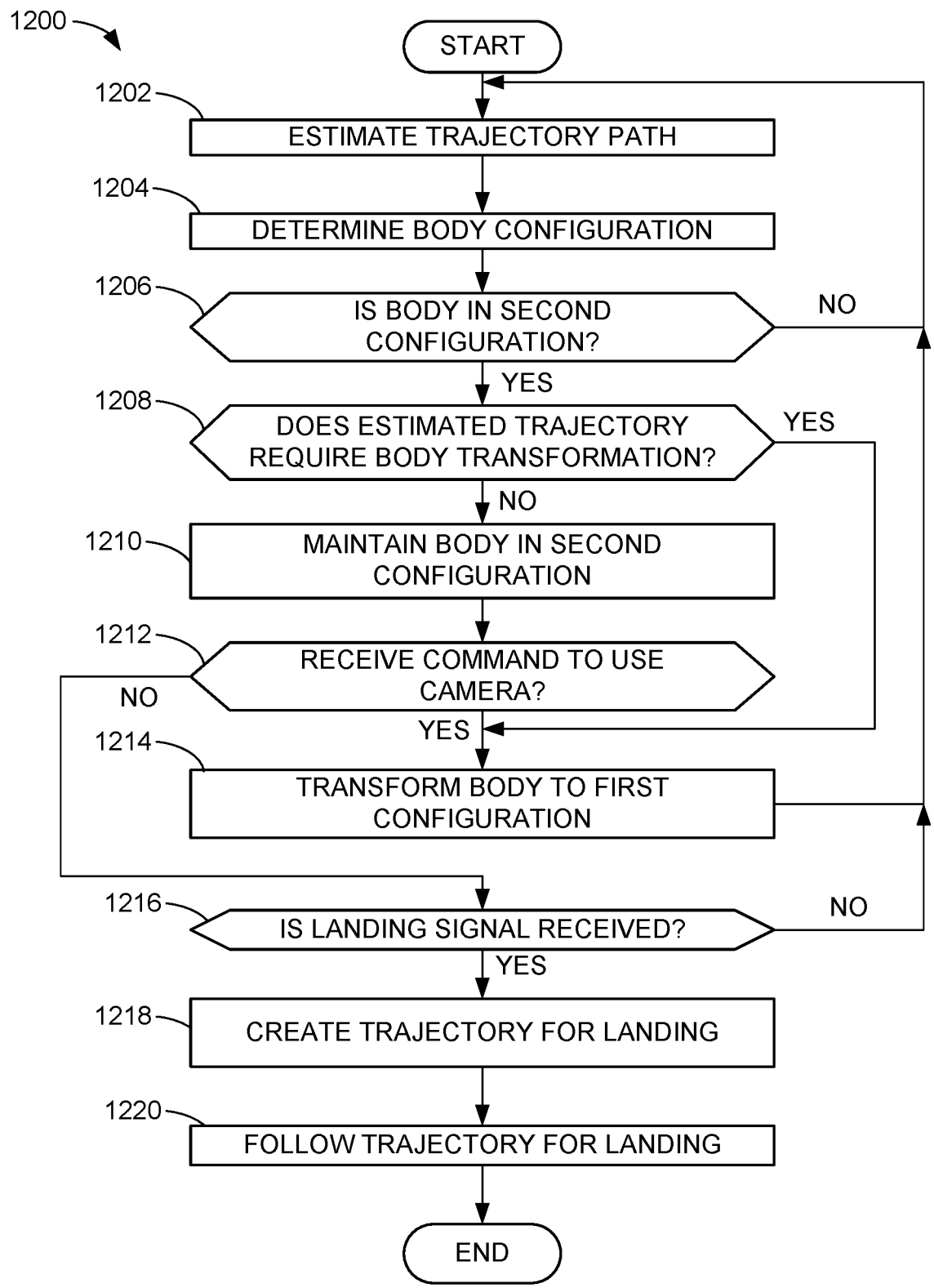
Figure 13:
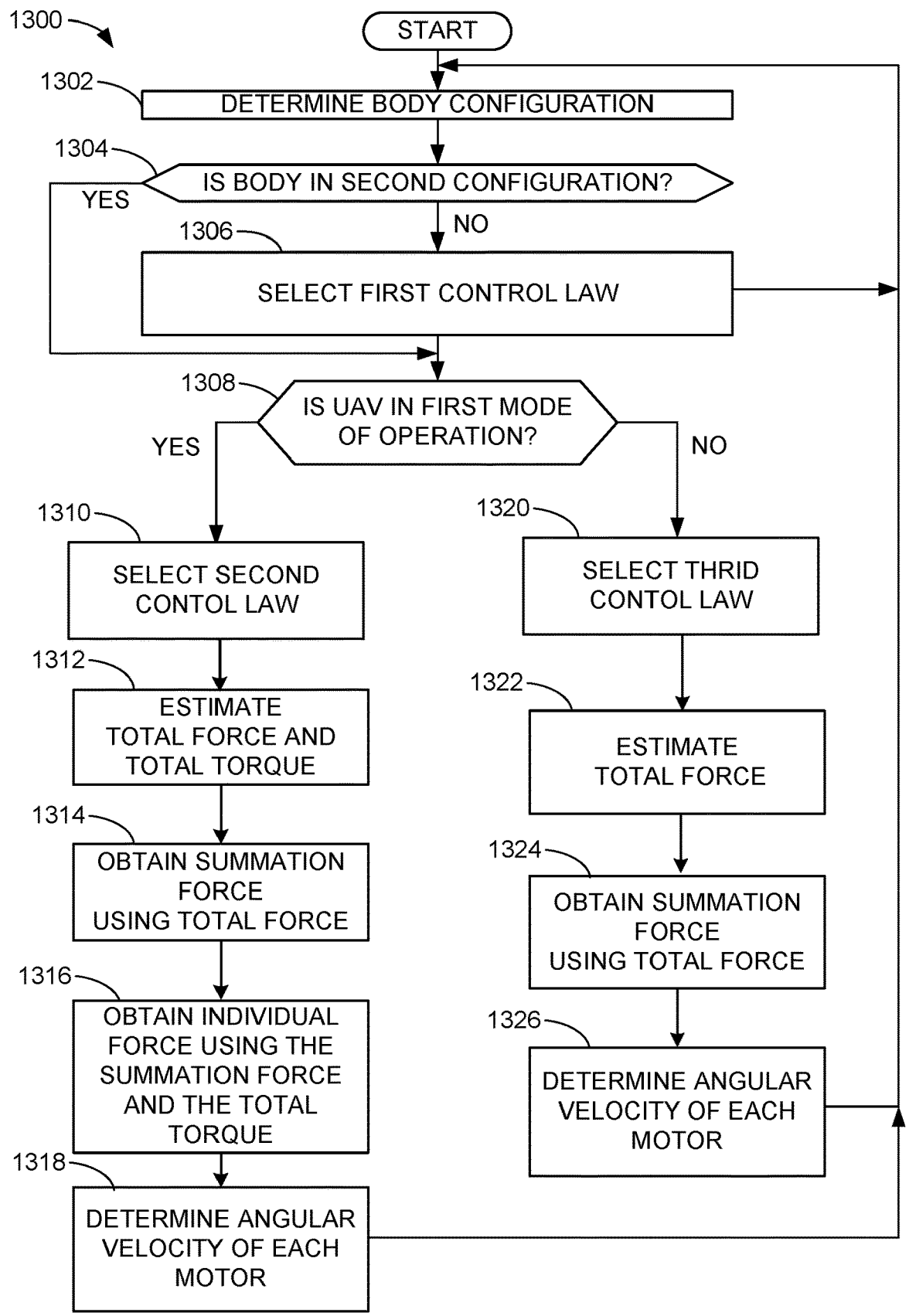

Flowchart representative of example machine readable instructions for implementing the controller 218 of FIG. 10 is shown in FIGS. 11-13. In this example, the machine readable instructions comprise a program for execution by a processor such as the processor 1412 shown in the example processor platform 1400 discussed below in connection with FIG. 14. The program may be embodied in software stored on a non-transitory computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 11-13, many other methods of implementing the example controller 218 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 11-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program 1100 of FIG. 11 begins at block 1102 when the trajectory planner 1006 estimates a trajectory path of the vehicle 100 (block 1102). For example, the trajectory planner 1006 plans a trajectory path of the vehicle 100 based on command inputs received from the input detector 1004.

The body configuration determiner 1008 determines a configuration of the body 104 (block 1104). For example, the body configuration determiner 1008 determines if the body 104 is in the first configuration 102 or the second configuration 202. If the body configuration determiner 1008 determines that the body 104 is not in the first configuration 102 (e.g., the body 104 is in the second configuration 202) (block 1106), the process returns to block 1102.

If the body configuration determiner 1008 determines that the body 104 is in the first configuration 102 (block 1106), the trajectory planner 1006 determines if the estimated trajectory requires body transformation (block 1108). For example, the trajectory planner 1006 may determine that the body 104 requires transformation from the first configuration 102 to the second configuration 202 based on structures, obstacles, etc., based on the estimated trajectory. For example, the trajectory planner 1006 may operate in the first configuration 102 to travel to a mine opening in the first mode of operation (e.g., aerial mode) and operate in the second configuration 202 to move inside the mine in the second mode of operation (e.g., ground mode).

If the trajectory planner 1006 determines that the estimated trajectory requires the body 104 to transform at block 1108, the actuation system controller 1010 causes the body 104 to transform to the second configuration 202 (block 1118). If the trajectory planner 1006 determines that the estimated trajectory does not require body transformation at block 1108, the body configuration determiner 1008 and/or the actuation system controller 1010 causes the body 104 of the vehicle 100 to maintain the first configuration 102. (block 1110).

In the first configuration 102, the proximity detector 1016 senses the environment (1112). For example, the proximity detector 1016 receives signals from a proximity sensor via the sensor interface 1002 to sense the environment along the trajectory path. The proximity detector 1016 detects if a potential collision between the vehicle 100 and an external object is detected (block 1114). For example, the proximity detector 1016 detects a potential collision by comparing a signal from the proximity sensor to a proximity threshold. For example, if the signal from the proximity sensor is less than the proximity threshold, the proximity detector 1016 determines that a potential collision is detected at block 1114. For example, if the signal from the proximity signal is greater than the proximity sensor, the proximity detector 1016 determines that a potential collision is not detected at block 1114.

If the proximity detector 1016 detects a possible collision at block 1114, the actuation system controller 1010 causes the body 104 to transform to the second configuration 202 (block 1118). If the proximity detector 1016 does not estimate a collision at block 1114, the body configuration determiner 1008 and/or the actuation system controller 1010 maintains the body 104 in the first configuration 102.

The input detector 1004 and/or the trajectory planner 1006 then determine if a landing signal is received (block 1116). For example, a landing signal may be received by the input detector 1004 and/or a landing sequence may be determined by the trajectory planner 1006 based on the estimated trajectory path. If a landing signal is not received at block 1116, the process returns to block 1102. If a landing signal is received at block 1116, the body configuration determiner 1008 and/or the actuation system controller 1010 transforms the body 104 to the second configuration 202 (block 1118).

The program 1200 of FIG. 12 begins at block 1202 when the trajectory planner 1006 estimates a trajectory path of the vehicle 100 (block 1202). For example, the trajectory planner 1006 plans a trajectory path of the vehicle 100 based on command inputs received from the input detector 1004.

The body configuration determiner 1008 determines a configuration of the body 104 (block 1204). For example, the body configuration determiner 1008 determines if the body 104 is in the first configuration 102 or the second configuration 202. If the body configuration determiner 1008 determines that the body 104 is not in the second configuration 202 (e.g., the body 104 is in the first configuration 102) (block 1206), the process returns to block 1202.

If the body configuration determiner 1008 determines that the body 104 is in the second configuration 202 (block 1206), the trajectory planner 1006 determines if the estimated trajectory requires body transformation (block 1208). For example, the trajectory planner 1006 may determine that the body 104 requires transformation from the second configuration 202 to the first configuration 102 based on (e.g., structures, obstacles, etc., that are presented in) the estimated trajectory. If the trajectory planner 1006 determines that the estimated trajectory does not require body transformation at block 1208, the body configuration determiner 1008 and/or the actuation system controller 1010 maintain the body 104 in the second configuration 202 (block 1210). If the trajectory planner 1006 determines that the estimated trajectory does require body transformation at block 1208, the body configuration determiner 1008 and/or the actuation system controller 1010 transform the body 104 to the first configuration 102 (block 1214).

While in the second configuration 202, the input detector 1004 determines if a command to use or activate the camera has been received (block 1212). If the input detector 1004 receives a command to use the camera at block 1212, the actuation system controller 1010 causes the body 104 to transform to the first configuration 102 (block 1214). The process then returns to block 1202. If the input detector 1004 did not receive a command to use the camera at block 1212, the body configuration determiner 1008 maintains the body in the second configuration 202.

The input detector 1004 and/or the trajectory planner 1006 then determine if a landing signal is received (block 1216). If a landing signal is not received at block 1216, the process returns to block 1202. If a landing signal is received at block 1216, the trajectory planner 1006 creates or determines a landing trajectory (block 1218) and the control law determiner 1012 causes the vehicle 100 to follow the landing trajectory (block 1220).

The program 1300 of FIG. 13 begins at block 1302 when the body configuration determiner 1008 determines a configuration of the body 104 (block 1302). For example, the body configuration determiner 1008 determines if the body 104 is in the first configuration 102 or the second configuration 202. If the body configuration determiner 1008 determines that the body 104 is not in the second configuration 202 (e.g., the body 104 is in the first configuration 102) (block 1304), the control law determiner 1012 applies a first control law (e.g., a traditional hexa-copter control law) to operate or maneuver the vehicle 100 along the trajectory path provided by the trajectory planner 1006 (block 1306).

If the body configuration determiner 1008 determines that the body 104 is in the second configuration 202 (block 1304), the control law determiner 1012 determines if the vehicle 100 is in the first mode of operation (block 1308). For example, to determine if the vehicle 100 is in the first mode of operation, the control law determiner 1012 may receive information from the sensor interface 1002 including, but not limited to, an altitude provided by the altimeter, one or more signals from the position sensor(s) 206, orientation sensor(s) 220, a signal from a GPS sensor, and/or any other sensor.

If the control law determiner 1012 determines that the vehicle 100 is operating in the first mode of operation at block 1308, the control law determiner 1012 of the illustrated example selects a second control law (block 1310). The second control law, for example, includes both translational motion and rotational motion components.

The control law determiner 1012 then calculates an estimated total force and an estimated total torque $T_T$ needed to maneuver the vehicle 100 along the estimated trajectory path provided by the trajectory planner 1006 (block 1312). For example, the trajectory planner 1006 employs equation 11 to determine the estimated total force ($F_{TW}$) and employs equation 12 to determine the estimated total torque ($T_T$).

The control law determiner 1012 then obtains or calculates a summation force $F_i$ (e.g., F1 ... F6) for each pair of propellers using the estimated total force (block 1314). For example, the control law determiner 1012 employs algorithms (e.g., using equations 1-20) to determine the summation force $F_i$ (e.g., F1 ... F6) for each pair of propellers 702.

After the summation force for each pair of propellers 702 is determined at block 1314, the control law determiner 1012 obtains an individual force for each propeller 702 in the upper section 120 and an individual force of each propeller 702 in the lower section 122 using the summation force obtained at block 1314 and the total torque value obtained at block 1312 (block 1316). For example, the control law determiner 1012 employs algorithms (e.g., applies equations 1-8) to obtain the individual force ($F_{i,u}$) for each propeller 702 in the upper section 120 (e.g., $F_{1,u}, \ldots, F_{6,u}$) and the individual force ($F_{i,l}$) for each propeller 702 in the lower section 122 ($F_{1,l}, \ldots, F_{6,l}$) using the summation force value $F_i$ obtained at block 1314 and the total torque value $T_T$ obtained at block 1312 (block 1316).

The control law determiner 1012 applies the individual force values to obtain the angular velocity values for each motor of the propellers 702 to operate or maneuver the body 104 along the estimated trajectory path provided by the trajectory planner 1006 (block 1318). For example, the control law determiner 1012 employs equations 9 and 10 with the individual force values ($F_{i,u}$ and $F_{i,l}$) and the individual torque values ($T_{i,u}$ and $T_{i,l}$) to obtain the angular velocity values for each motor of the propellers 702 to operate or maneuver the body 104 along the estimated trajectory path provided by the trajectory planner 1006. The motor controller 1014 operates the motors of the propellers 702 based on the angular velocity values provided by the control law determiner 1012 at block 1318.

If the control law determiner 1012 determines that the vehicle 100 is operating in the second mode of operation at block 1308, the control law determiner 1012 of the illustrated example selects a third control law (block 1320). The control law determiner 1012 then calculates an estimated total force ($F_{TW}$) needed to maneuver the vehicle 100 along the estimated trajectory path provided by the trajectory planner 1006 (block 1322). The control law determiner 1012 obtains or calculates a summation force $F_i$ (e.g., F1 ... F6) for each pair of propellers 702 using the estimated total force ($F_{Tw}$) (block 1324). For example, the control law determiner 1012 obtains or calculates a summation force $F_L$ (e.g., F1 ... F6) for each pair of propellers 702 using the estimated total force ($F_{Tw}$). After the summation force for each pair of propellers 702 is determined at block 1324, the control law determiner 1012 obtains an individual force for each propeller 702 in the upper section 120 and an individual force of each propeller 702 in the lower section 122 using the summation force values obtained at block 1324 (block 1326). For example, the control law determiner 1012 uses the equations noted above to obtain the individual force ($F_{i,u}$) for each propeller 702 in the upper section 120 (e.g., $F_{1,u}, \ldots, F_{6,u}$) and an individual force ($F_{i,l}$) for each propeller 702 in the lower section 122 ($F_{1,l}, \ldots, F_{6,l}$) using the summation force values ($F_i$) obtained at block 1324. The control law determiner 1012 applies the individual force values (e.g., the individual force values $F_{i,u}$ and $F_{i,l}$) to obtain the angular velocity values for each motor of the propellers 702. For example, in the second mode of operation, the control law determiner 1012 sets $F_{1,l}$ equal to $F_{6,l}$. The motor controller 1014 operates the motors of the propellers 702 based on the angular velocity values provided by the control law determiner 1012.

Figure 14:
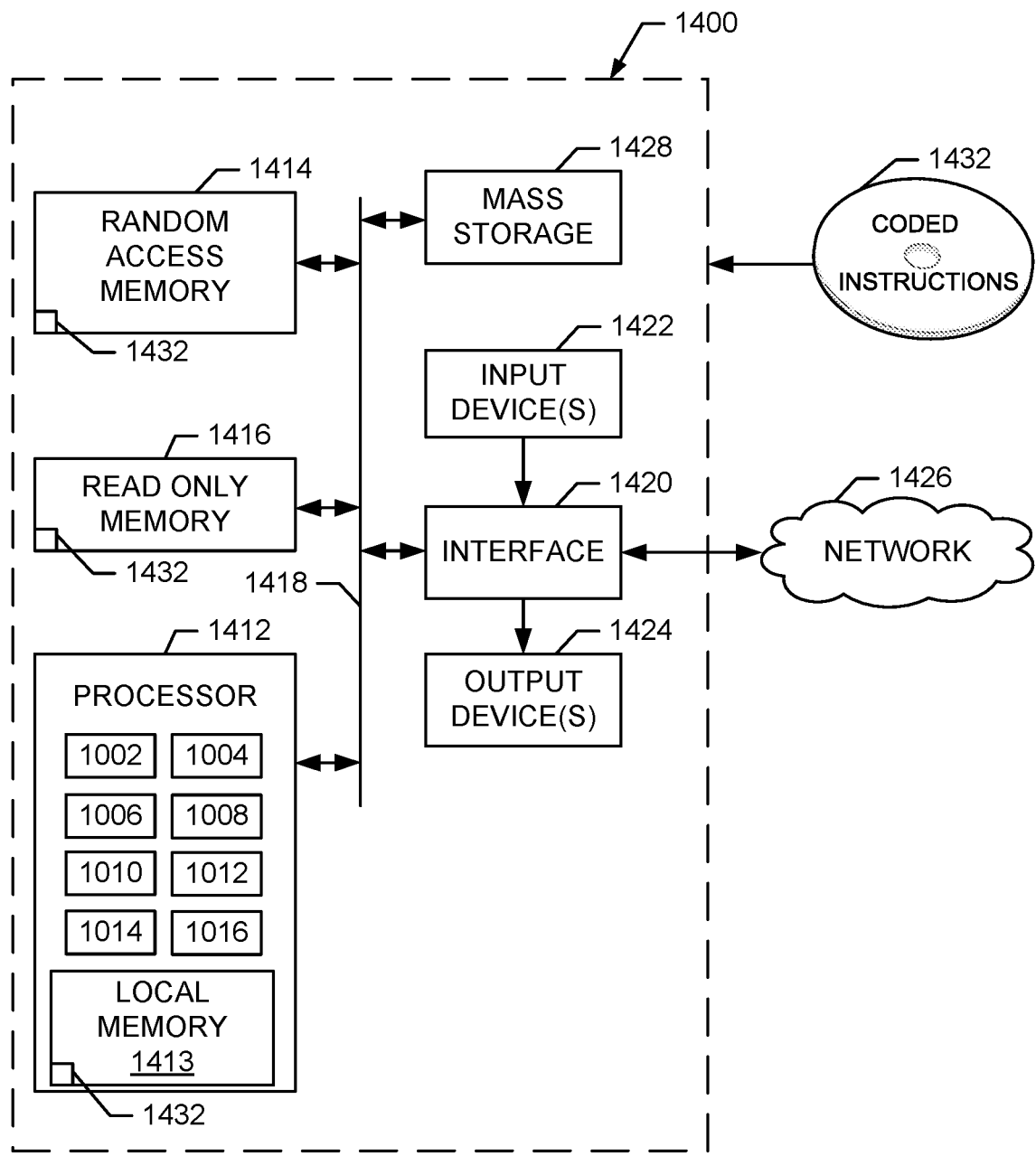
FIG. 14 is a schematic illustration of an example processor platform that may execute the instructions of FIGS. 11-13 to implement the example processor of FIG. 10.

FIG. 14 is a block diagram of an example processor platform 1400 capable of executing the instructions of FIGS. 11-13 to implement the controller 218 of FIG. 10. The processor platform 1400 can be, for example, a server, a personal computer, a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The hardware processor may be a semiconductor based (e.g., silicon based) device. In this example, the processor implements the example sensor interface 1002, the example input detector 1004, the example trajectory planner 1006, the example body configuration determiner 1008, the example actuation system controller 1010, the example control law determiner 1012, the example motor controller 1014 and the example proximity detector 1016.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system. Example input devices may include an accelerometer, the orientation sensor(s) 220, the position sensor(s) 222, the proximity sensor(s) 224, the switch sensor(s) 226, a GPS sensor, a gyroscope, a gimbal, and/or other sensor(s) of the vehicle 100.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 11-13 may be stored in the mass storage device 1428, in the volatile memory 1414, in the non-volatile memory 1416, and/or on a removable tangible computer readable storage medium such as a CD or DVD.

Example unmanned vehicles are disclosed. Further examples and combinations thereof include the following.

Example 1 may be an unmanned vehicle including a body having a first cap; a second cap spaced from the first cap; and a plurality of segments radially spaced relative to a longitudinal axis of the body, the segments being movable relative to the first cap and the second cap. The vehicle may include an actuation system to move the segments relative to the first cap and the second cap to transform the body between a first configuration and a second configuration different than the first configuration.

Example 2 includes the vehicle of example 1, wherein each of the segments includes an upper section, a lower section, and an intermediate section.

Example 3 includes the vehicle in any one of examples 1-2, wherein upper segment includes a proximal end and a distal end, the proximal end of the upper segment being movably coupled to the first cap and the distal end of the upper segment being movably coupled to an upper end of the intermediate section.

Example 4 includes the vehicle in any one of examples 1-3, wherein lower segment includes a proximal end and a distal end, the proximal end of the lower segment being movably coupled to the second cap and the distal end of the lower segment being movably coupled to a lower end of the intermediate section.

Example 5 includes the vehicle in any one of examples 1-4, wherein the upper section includes a first rotor.

Example 6 includes the vehicle in any one of examples 1-5, wherein the first rotor is coupled to the upper section via a first support beam.

Example 7 includes the vehicle in any one of examples 1-6, wherein the upper section includes a first opening at least partially aligned with the first rotor.

Example 8 includes the vehicle in any one of examples 1-7, wherein the lower section includes a second rotor.

Example 9 includes the vehicle in any one of examples 1-8, wherein the second rotor is coupled to the lower section via a second support beam.

Example 10 includes the vehicle in any one of examples 1-9, wherein the lower section includes a second opening at least partially aligned with the second rotor.

Example 11 includes the vehicle in any one of examples 1-10, wherein the actuation system includes shape memory alloy, and wherein at least a portion of the segments is composed of shape memory alloy.

Example 12 includes the vehicle in any one of examples 1-11, wherein the actuation system includes a connector, a motor and a transmission to couple the motor and the connector, the connector being coupled to at least one of the first cap, the second cap or the segments, wherein operation of the motor in a first direction is to transform the body to the first configuration and operation of the motor in a second direction opposite the first direction is to transform the body to the second configuration.

Example 13 includes the vehicle in any one of examples 1-12, wherein the body has a disk profile in the first configuration and the body has sphere profile in the second configuration.

Example 14 includes the vehicle of examples 1-13, wherein the vehicle has a first mode of operation when the body is in the first configuration, and the vehicle has the first mode of operation and a second mode of operation when the body is in the second configuration.

Example 15 includes the vehicle in any one of examples 1-14, further comprising a payload supported by the first cap, the second cap being positioned between the first cap and the payload when the body is in the first configuration, and the payload being positioned between the first cap and the second cap when the body is in the second configuration.

Example 16 may be an unmanned vehicle including means for forming a body that is transformable between a substantially planer configuration and sphere configuration; means for generating lift to enable the body to operate in an aerial mode when the body is in the substantially planer configuration and the sphere configuration; and means for generating a rolling torque to enable the body to operate in a ground mode when the body is in the sphere configuration, wherein the means for generating lift is the same as the means for generating the rolling torque.

Example 17 includes the vehicle of example 16, further including means for actuating to transform the body between the substantially planer configuration and the sphere configuration.

Example 18 includes the vehicle in any one of examples 16 and 17, further including means for sensing coupled to the body, the means for sensing being positioned inside a cavity of the body when the body is in the sphere configuration and the means for sensing being positioned outside of the cavity of the body when the body is in the substantially planer configuration.

Example 19 may be an example unmanned vehicle including a body configurable between a spherical shape and a disk shape. The body has an upper cap; a lower cap spaced from the upper cap; and a plurality of segments radially spaced relative to the upper cap and the lower cap. Each segment includes: an upper section having a first end pivotally attached to the upper cap; a lower section having a second end pivotally attached to the lower cap; and an intermediate section positioned between the upper section and the lower section, the first upper section having a third end pivotally attached to an upper end of the intermediate section, and the lower section having a fourth end pivotally attached to a lower end of the intermediate section, the upper section having a first opening between the first end and the third end, and the lower section having a second opening between the second end and the fourth end; a first rotor supported by the upper section, the first rotor being aligned with the first opening; and a second rotor supported by the lower section, the second rotor being aligned with the second opening. The example vehicle may include an actuation system to cause the upper cap to move relative to the lower cap to transform the body between the spherical shape and the disk shape.

Example 20 includes the vehicle of example of claim 19, further including a payload supported by the upper cap via a post, the payload being encased within the body when the body is the spherical shape and the payload to be exposed relative to the body when the body is the disk shape.

Example 21 includes a method of operating an unmanned vehicle including determining if a configurable body is in a first configuration or a second configuration different than the first configuration, the body being capable of operating in a first mode of operation when the body is in the first configuration, the body being capable of operating in the first mode of operation and a second mode of operation when the body is in the second configuration; and selecting between a first control law to control the body when the body is in the first configuration and operating in the first mode of operation, a second control law to control the body when the body is in the second configuration and operating in the first mode of operation, and a third control law to control the body when the body is in the second configuration and operating in the second mode of operation.

Example 22 includes the method in any one of example 21, further including operating a first rotor in an upper section of the body and a second rotor in a lower section of the body that is aligned with the first rotor of the upper section to maneuver the body.

Example 23 includes the method in any one of examples 21-22, further including estimating a trajectory path of the vehicle based on a received command input.

Example 24 includes the method of examples 22-23, wherein in response to determining the body is in the second configuration and in the first mode of operation and selecting the second control law, further including estimating a total force needed to move the body along a translational component of the trajectory path and estimating a total torque needed to move the body along a rotational component of the trajectory path.

Example 25 includes the method in any one of examples 22-24, further including calculating, based on the estimated total force, a summation force associated with first rotor and the second rotor.

Example 26 includes the method in any one of examples 22-25, further including calculating, based on the estimated total torque, the estimated total force and the summation force, a first force to be generated by the first rotor and a second force to be generated by the second rotor.

Example 27 includes the method in any one of examples 22-26, further including calculating a first angular velocity of a first motor based on the first force and calculating a second angular velocity of a second motor based on the second force.

Example 28 includes the method in any one of examples 22-27, wherein in response to determining the body is in the second configuration and in the second mode of operation and selecting the third control law, further including determining an estimated total force needed to move the body along a translational component of the trajectory path.

Example 29 includes the method in any one of examples 22-28, further including calculating, based on the estimated total force, a summation force associated with first rotor and the second rotor.

Example 30 includes the method in any one of examples 22-29, further including calculating, based on the estimated total force and the summation force, a first force to be generated by the first rotor and a second force to be generated by the second rotor.

Example 31 includes the method in any one of examples 22-30, further including calculating a first angular velocity of a first motor based on the first force and calculating a second angular velocity of a second motor based on the second force.

Example 32 is an example method including: determining if a configurable body is in a first configuration or a second configuration different than the first configuration, the body being capable of operating in a first mode of operation when the body is in the first configuration, the body being capable of operating in the first mode of operation and a second mode of operation when the body is in the second configuration; determining an estimated trajectory path of the body; detecting if the estimated trajectory path requires body transformation; and in response to detecting the body being in the first configuration and in response to detecting the estimated trajectory path requires body transformation, transforming the body from the first configuration to the second configuration; or in response to detecting the body being in the second configuration and detecting the estimated trajectory path requires body transformation, transforming the body from the second configuration to the first configuration.

Example 33 includes the method in any one of example 32, further including sensing an environment surrounding the body when the body is in the first configuration to determine if the trajectory path requires body transformation.

Example 34 includes the method in any one of examples 32-33, wherein detecting if the trajectory path requires body transformation includes detecting a potential collision of the body with an external object.

Example 35 includes the method in any one of examples 32-34, further including receiving a landing signal and, in response to receiving the landing signal, determining if the body is in the second configuration.

Example 36 includes the method in any one of examples 32-35, further including transforming the body from the first configuration to the second configuration in response to determining that that the body is in the first configuration when the landing signal is received.

Example 37 includes the method in any one of examples 32-36, further including receiving a signal to activate a camera supported by the body and, in response to receiving the signal to use the camera, transforming the body from the second configuration to the first configuration.

Example 38 is a non-transitory machine readable medium comprising executable instructions that, when executed, cause at least one processor to: determine if a configurable body is in a first configuration or a second configuration different than the first configuration, the body being capable of operating in a first mode of operation when the body is in the first configuration, the body being capable of operating in the first mode of operation and a second mode of operation when the body is in the second configuration; and select between a first control law to control the body when the body is in the first configuration and operating in the first mode of operation, a second control law to control the body when the body is in the second configuration and operating in the first mode of operation, and a third control law to control the body when the body is in the second configuration and operating in the second mode of operation.

Example 39 includes the non-transitory machine readable medium as defined in Example 38, comprising executable instructions that, when executed, cause the at least one processor to operate a first rotor in an upper section of the body and a second rotor in a lower section of the body that is aligned with the first rotor of the upper section to maneuver the body.

Example 40 includes the non-transitory machine readable medium as defined in any one of Examples 38-39, comprising executable instructions that, when executed, cause the at least one processor to estimate a trajectory path of the vehicle based on a received command input.

Example 41 includes the non-transitory machine readable medium as defined in any one of Examples 38-40, comprising executable instructions that, when executed, cause the at least one processor to estimate a total force needed to move the body along a translational component of the trajectory path and estimate a total torque needed to move the body along a rotational component of the trajectory path, in response to determining the body is in the second configuration and in the first mode of operation and selecting the second control law.

Example 42 includes the non-transitory machine readable medium as defined in any one of Examples 38-41, comprising executable instructions that, when executed, cause the at least one processor to calculate, based on the estimated total force, a summation force associated with first rotor and the second rotor.

Example 43 includes the non-transitory machine readable medium as defined in any one of Examples 38-42, comprising executable instructions that, when executed, cause the at least one processor to calculate, based on the estimated total torque, the estimated total force and the summation force, a first force to be generated by the first rotor and a second force to be generated by the second rotor.

Example 44 includes the non-transitory machine readable medium as defined in any one of Examples 38-43, comprising executable instructions that, when executed, cause the at least one processor to calculate a first angular velocity of a first motor based on the first force and calculating a second angular velocity of a second motor based on the second force.

Example 45 includes the non-transitory machine readable medium as defined in any one of Examples 38-44, comprising executable instructions that, when executed, cause the at least one processor to determine an estimated total force needed to move the body along a translational component of the trajectory path in response to determining the body is in the second configuration and in the second mode of operation and selecting the third control law.

Example 46 includes the non-transitory machine readable medium as defined in any one of Examples 38-45, comprising executable instructions that, when executed, cause the at least one processor to calculate, based on the estimated total force, a summation force associated with first rotor and the second rotor.

Example 47 includes the non-transitory machine readable medium as defined in any one of Examples 38-46, comprising executable instructions that, when executed, cause the at least one processor to calculate, based on the estimated total force and the summation force, a first force to be generated by the first rotor and a second force to be generated by the second rotor.

Example 48 includes the non-transitory machine readable medium as defined in any one of Examples 38-47, comprising executable instructions that, when executed, cause the at least one processor to calculate a first angular velocity of a first motor based on the first force and calculating a second angular velocity of a second motor based on the second force.

Example 49 is a non-transitory machine readable medium comprising executable instructions that, when executed, cause at least one processor to: determine if a configurable body is in a first configuration or a second configuration different than the first configuration, the body being capable of operating in a first mode of operation when the body is in the first configuration, the body being capable of operating in the first mode of operation and a second mode of operation when the body is in the second configuration; determine an estimated trajectory path of the body; detect if the estimated trajectory path requires body transformation; and in response to detecting the body being in the first configuration and in response to detecting the estimated trajectory path requires body transformation, transform the body from the first configuration to the second configuration; or in response to detecting the body being in the second configuration and detecting the estimated trajectory path requires body transformation, transform the body from the second configuration to the first configuration.

Example 50 includes the non-transitory machine readable medium as defined in Example 49, comprising executable instructions that, when executed, cause the at least one processor to sense an environment surrounding the body when the body is in the first configuration to determine if the trajectory path requires body transformation.

Example 51 includes the non-transitory machine readable medium as defined in any one of Examples 49-50, comprising executable instructions that, when executed, cause the at least one processor to detect a potential collision of the body with an external object.

Example 52 includes the non-transitory machine readable medium as defined in any one of Examples 49-51, comprising executable instructions that, when executed, cause the at least one processor to receive a landing signal and, in response to receiving the landing signal, determine if the body is in the second configuration.

Example 53 includes the non-transitory machine readable medium as defined in any one of Examples 49-52, comprising executable instructions that, when executed, cause the at least one processor to transform the body from the first configuration to the second configuration in response to determining that that the body is in the first configuration when the landing signal is received.

Example 54 includes the non-transitory machine readable medium as defined in any one of Examples 49-53, comprising executable instructions that, when executed, cause the at least one processor to receive a signal to activate a camera supported by the body and, in response to receiving the signal to use the camera, transform the body from the second configuration to the first configuration.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An unmanned vehicle comprising:
   a body including:
      a first cap;
      a second cap spaced from the first cap; and
      a plurality of segments radially spaced relative to a longitudinal axis of the body, the segments being movable relative to the first cap and the second cap;
   an actuation system to move the segments relative to the first cap and the second cap to transform the body between a first configuration and a second configuration different than the first configuration, and
   a drive system to control aerial navigation of the body when the body is in either the first configuration or the second configuration, the drive system to control ground based navigation of the body when the body is in the second configuration.

2. The vehicle of claim 1, wherein each of the segments includes an upper section, a lower section, and an intermediate section.

3. The vehicle of claim 2, wherein the upper section includes a proximal end and a distal end, the proximal end of the upper section being movably coupled to the first cap and the distal end of the upper section being movably coupled to an upper end of the intermediate section.

4. The vehicle of claim 2, wherein the lower section includes a proximal end and a distal end, the proximal end of the lower section being movably coupled to the second cap and the distal end of the lower section being movably coupled to a lower end of the intermediate section.

5. The vehicle of claim 2, wherein the upper section includes a first rotor of the drive system.

6. The vehicle of claim 5, wherein the first rotor is coupled to the upper section via a first support beam.

7. The vehicle of claim 5, wherein the upper section includes a first opening at least partially aligned with the first rotor.

8. The vehicle of claim 7, wherein the lower section includes a second rotor of the drive system.

9. The vehicle of claim 8, wherein the second rotor is coupled to the lower section via a second support beam.

10. The vehicle of claim 9, wherein the lower section includes a second opening at least partially aligned with the second rotor.

11. The vehicle of claim 1, wherein the actuation system includes shape memory alloy, and wherein at least a portion of the segments is composed of shape memory alloy.

12. An unmanned vehicle comprising:
    a body including:
       a first cap;
       a second cap spaced from the first cap; and
       a plurality of segments radially spaced relative to a longitudinal axis of the body, the segments being movable relative to the first cap and the second cap; and
    an actuation system to move the segments relative to the first cap and the second cap to transform the body between a first configuration and a second configuration different than the first configuration, the actuation system including a connector, a motor and a transmission to couple the motor and the connector, the connector being coupled to at least one of the first cap, the second cap or the segments, wherein operation of the motor in a first direction is to transform the body to the first configuration and operation of the motor in a second direction opposite the first direction is to transform the body to the second configuration.

13. The vehicle of claim 1, wherein the body has a disk profile in the first configuration and the body has sphere profile in the second configuration.

14. The vehicle of claim 12, wherein the vehicle has a first mode of operation when the body is in the first configuration, and the vehicle has the first mode of operation and a second mode of operation when the body is in the second configuration.

15. An unmanned vehicle comprising:
    a body including:
       a first cap;
       a second cap spaced from the first cap; and
       a plurality of segments radially spaced relative to a longitudinal axis of the body, the segments being movable relative to the first cap and the second cap;
    an actuation system to move the segments relative to the first cap and the second cap to transform the body between a first configuration and a second configuration different than the first configuration; and
    a payload supported by the first cap, the second cap being positioned between the first cap and the payload when the body is in the first configuration, and the payload being positioned between the first cap and the second cap when the body is in the second configuration.

16. The vehicle of claim 1, wherein the drive system includes a plurality of rotors, the drive system to enable independent control of the rotors to enable directional control of the body when the body is in the first configuration, the drive system to enable independent control of the rotors to enable directional control of the body when the body is in the second configuration.

17. An unmanned vehicle comprising:
    a body configurable between a spherical shape and a disk shape, the body including:
       an upper cap;
       a lower cap spaced from the upper cap;
       a plurality of segments radially spaced relative to the upper cap and the lower cap, each segment including:
          an upper section having a first end pivotally attached to the upper cap;
          a lower section having a second end pivotally attached to the lower cap; and
          an intermediate section positioned between the upper section and the lower section, the upper section having a third end pivotally attached to an upper end of the intermediate section, and the lower section having a fourth end pivotally attached to a lower end of the intermediate section, the upper section having a first opening between the first end and the third end, and the lower section having a second opening between the second end and the fourth end;

a first rotor supported by the upper section, the first rotor aligned with the first opening;

a second rotor supported by the lower section, the second rotor aligned with the second opening; and an actuation system to cause the upper cap to move relative to the lower cap to transform the body between the spherical shape and the disk shape.

18. The vehicle of claim 17, further including a payload supported by the upper cap via a post, the payload being encased within the body when the body is in the spherical shape and the payload to be exposed relative to the body when the body is in the disk shape.

* * * * *